United States Patent
Kim et al.

(10) Patent No.: US 9,983,923 B2
(45) Date of Patent: May 29, 2018

(54) APPARATUS FOR RECOVERING COMMUNICATION AND METHOD FOR CONTROLLING THE APPARATUS

(71) Applicant: SAMSUNG ELECTRONICS CO., LTD., Suwon-si (KR)

(72) Inventors: Ki Hun Kim, Suwon-si (KR); Jin Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 41 days.

(21) Appl. No.: 15/055,781

(22) Filed: Feb. 29, 2016

(65) Prior Publication Data

US 2016/0357626 A1 Dec. 8, 2016

(30) Foreign Application Priority Data

Jun. 4, 2015 (KR) ........................ 10-2015-0079019

(51) Int. Cl.
| | |
|---|---|
| G06F 11/00 | (2006.01) |
| G06F 11/07 | (2006.01) |
| H04L 12/12 | (2006.01) |
| H04W 52/02 | (2009.01) |
| G06F 1/32 | (2006.01) |

(52) U.S. Cl.
CPC ........ G06F 11/0793 (2013.01); G06F 1/3209 (2013.01); G06F 1/3296 (2013.01); G06F 11/0721 (2013.01); H04L 12/12 (2013.01); H04W 52/0206 (2013.01); Y02B 60/50 (2013.01)

(58) Field of Classification Search
USPC ........................................... 714/14
See application file for complete search history.

(56) References Cited

U.S. PATENT DOCUMENTS

| | | | |
|---|---|---|---|
| 6,101,608 A | 8/2000 | Schmidt et al. | |
| 7,412,053 B1 * | 8/2008 | Lyle ...................... | H04L 9/0844 324/750.3 |
| 2008/0288828 A1 * | 11/2008 | Baker ...................... | G06F 13/24 714/47.2 |
| 2010/0229015 A1 | 9/2010 | Hebron et al. | |

(Continued)

FOREIGN PATENT DOCUMENTS

WO 2014201990 A1 12/2014

OTHER PUBLICATIONS

Communication dated Oct. 11, 2016 issued by the European Patent Office in counterpart European Patent Application No. 16158878.5.

(Continued)

*Primary Examiner* — Sarai E Butler
(74) *Attorney, Agent, or Firm* — Sughrue Mion, PLLC

(57) ABSTRACT

An apparatus includes at least one processor to implement a communicator configured to determine whether a wakeup condition of the apparatus is satisfied while the apparatus is currently in a sleep mode, and transmit a wakeup command and a recover communication command in response to determining that the wakeup condition is satisfied; and an operator configured to perform a wakeup operation in response to the wakeup command and, and control communication of the communicator to be recovered in response to the recover communication command.

14 Claims, 17 Drawing Sheets

(56) References Cited

U.S. PATENT DOCUMENTS

| | | | |
|---|---|---|---|
| 2010/0262862 A1* | 10/2010 | Watanabe | G06F 11/1471 714/19 |
| 2011/0119510 A1* | 5/2011 | Ahn | G06F 1/3203 713/323 |
| 2012/0120958 A1 | 5/2012 | Mahadevan et al. | |
| 2014/0053014 A1* | 2/2014 | MacQuarrie | G06F 11/0793 714/4.2 |
| 2014/0310556 A1* | 10/2014 | Agetsuma | G06F 13/00 714/6.12 |

OTHER PUBLICATIONS

Communication dated Dec. 19, 2017, issued by the European Patent Office in counterpart European application No. 16 158 878.5.

* cited by examiner

APPARATUS FOR RECOVERING COMMUNICATION AND METHOD FOR CONTROLLING THE APPARATUS

CROSS-REFERENCE TO RELATED APPLICATION(S)

This application claims priority from a Korean Patent Application No. 10-2015-0079019, filed on Jun. 4, 2015, in the Korean Intellectual Property Office, the disclosure of which is incorporated herein in its entirety by reference.

BACKGROUND

1. Field

Apparatuses and methods consistent with exemplary embodiments relate to an apparatus for recovering communication with another apparatus and a method for controlling the apparatus.

2. Description of the Related Art

A device may be connected to other devices over a variety of networks and/or communication systems.

With recent advancements in technologies of network and/or communication system, technologies for remotely controlling various devices, such as televisions, audio systems, printers, computers, etc., are being developed and studies on minimizing power consumption of the devices are also being actively conducted.

For example, there is a technology to minimize power consumption of the device by converting the device into a sleep mode while the device is not used and waking up the device if the device is to be used.

The mode conversion between the sleep mode and a wake-up mode may be performed by wired communication, wireless communication, or remote communication.

The device receives a packet that includes a wakeup control command transmitted from another device, and performs wakeup operation by turning on power according to the wakeup control command included in the packet.

If communication is interrupted or an internal error occurs in the device due to environmental interference in the sleep mode, the device may not perform wakeup operation because of difficulty in recovering the communication.

SUMMARY

One or more exemplary embodiments provide an apparatus for recovering communication and a method for controlling the apparatus, in which an operation module recovers interrupted communication between a communication module of the apparatus and a repeater.

One or more exemplary embodiments also provide an apparatus for recovering communication and a method for controlling the apparatus, in which an operation module controls recovery of communication of a communication module after a lapse of a predetermined period of time.

According to an aspect of an exemplary embodiment, provided is an apparatus including at least one processor to implement: a communicator configured to determine whether a wakeup condition of the apparatus is satisfied while the apparatus is currently in a sleep mode, and transmit a wakeup command and a recover communication command in response to determining that the wakeup condition is satisfied; and an operator configured to perform a wakeup operation in response to the wakeup command, and control communication of the communicator to be recovered in response to the recover communication command.

The communicator may communicate with a repeater configured to relay communication with another apparatus, and the wakeup condition may include at least one of a condition in which communication between the communicator and the repeater is unavailable and a condition in which time that is set to recover communication arrives.

The time that is set to recover communication may be a time based on a preset interval.

The communicator may transmit the wakeup command and the recover communication command to the operator in response to arrival of the time that is set to recover communication.

The condition in which communication with the repeater is unavailable may include at least one of a status of interruption of the communication between the communicator and the repeater and a status of poor security between the communicator and the repeater.

The operator may enter into the sleep mode in response to completion of recovery of the communication of the communicator.

According to an aspect of an exemplary embodiment, provided is an apparatus including at least one processor to implement: a communicator configured to communicate with a repeater, which is configured to relay communication with a second apparatus, determine availability of communication between the communicator and the repeater when the apparatus is currently in a sleep mode, and transmit a wakeup command and a recover communication command in response to determining that the communication between the communicator and the repeater is unavailable; and an operator configured to perform a wakeup operation in response to the wakeup command and control communication of the communicator to be recovered in response to the recover communication command.

The communicator may determine that the communication between the communicator and the repeater is unavailable based on at least one of a status of interruption of the communication between the communicator and the repeater and a status of poor security between the communicator and the repeater.

The apparatus may further include a storage configured to store a computer program to be executed by the at least one processor to control recovery of the communication of the communicator.

The at least one processor may further implement: a load configured to cause the at least one processor to perform at least one function, wherein the operator is configured to control an operation of the load in response to the recover communication command.

The operator may enter into the sleep mode in response to completion of recovery of the communication of the communicator.

The communicator may transmit the wakeup command and the recover communication command to the operator in response to arrival of time that is set to recover communication.

The communicator may receive a second wakeup command from the second apparatus through the repeater via the communication between the communicator and the repeater that is available, and transmit the second wakeup command to the operator such that the operator performs an active mode in response to the second wakeup command.

The second wakeup command may be included in a magic packet that is generated by the second apparatus.

The magic packet may include operation information indicating a function to be performed when the apparatus enters into the active mode, and the communicator may transmit the operation information to the operator.

According to an aspect of an exemplary embodiment, provided is an apparatus for communicating with a repeater that relays communication with a second apparatus, the apparatus including at least one processor to implement: a communicator configured to transmit a wakeup command and a recover communication command at a preset interval while the apparatus is currently in a sleep mode; and an operator configured to perform a wakeup operation in response to the wakeup command and control communication of the communicator to be recovered in response to the recover communication command.

The apparatus may further include a user interface, wherein the preset interval is set by an input that is received through the user interface.

The operator may enter into the sleep mode in response to completion of recovery of the communication of the communicator.

According to an aspect of an exemplary embodiment, provided is a method for controlling an apparatus for communicating with a repeater that relays communication with a second apparatus, the method including: performing, by an operator, a wakeup operation in response to receiving a wakeup command from a communicator of the apparatus while the apparatus is currently in a sleep mode; controlling, by the operator, recovery of communication of the communicator in response to receiving a recover communication command from the communicator; and controlling, by the operator, the apparatus to enter into the sleep mode in response to completion of the recovery of the communication.

The method may further include checking availability of communication between the communicator and the repeater, using the communicator; and transmitting, by the communicator, the wakeup command and the recover communication command to the operator in response to determining that the communication between the communicator and the repeater is unavailable.

The determining that the communication between the communicator and the repeater is unavailable may include determining at least one of a status of interruption of the communication between the communicator and the repeater and a status of poor security between the communicator and the repeater.

The method may further include controlling an operation of a load to be stopped during the recovery of the communication.

The controlling the device to enter into the sleep mode may include controlling the operator to enter into the sleep mode in response to the completion of the recovery of the communication.

The method may further include determining whether a time that is set to recover communication arrives, using the communicator; and transmitting the wakeup command and the recover communication command to the operator in response to determining that the time that is set to recover communication arrives.

The method may further include performing an active mode by transmitting a second wakeup command to the operator in response to receiving the second wakeup command from the second apparatus through the repeater while communication between the communicator and the repeater is available.

According to an aspect of an exemplary embodiment, provided is an apparatus including: at least one memory configured to store program code; at least one processor configured to read the program code and operate as instructed by the program code to: determine whether communication with a repeater, which was previously connected to the apparatus and configured to relay communication between the apparatus and another apparatus, is available while the apparatus is currently in a sleep mode, and in response to determining that the communication with the repeater is unavailable, switch from the sleep mode to an active mode and control to recover the communication with the repeater.

The at least one processor may be further instructed by the program to switch from the sleep mode to the active mode and control to recover the communication with the repeater at a specific time set by a user or at a preset interval.

The at least one processor may be further instructed by the program to enter into the sleep mode in response to completion of recovery of the communication with the repeater.

BRIEF DESCRIPTION OF THE DRAWINGS

The above and/or other aspects will be more apparent by describing certain example embodiments with reference to the accompanying drawings, in which.

DETAILED DESCRIPTION

Figure 1A:
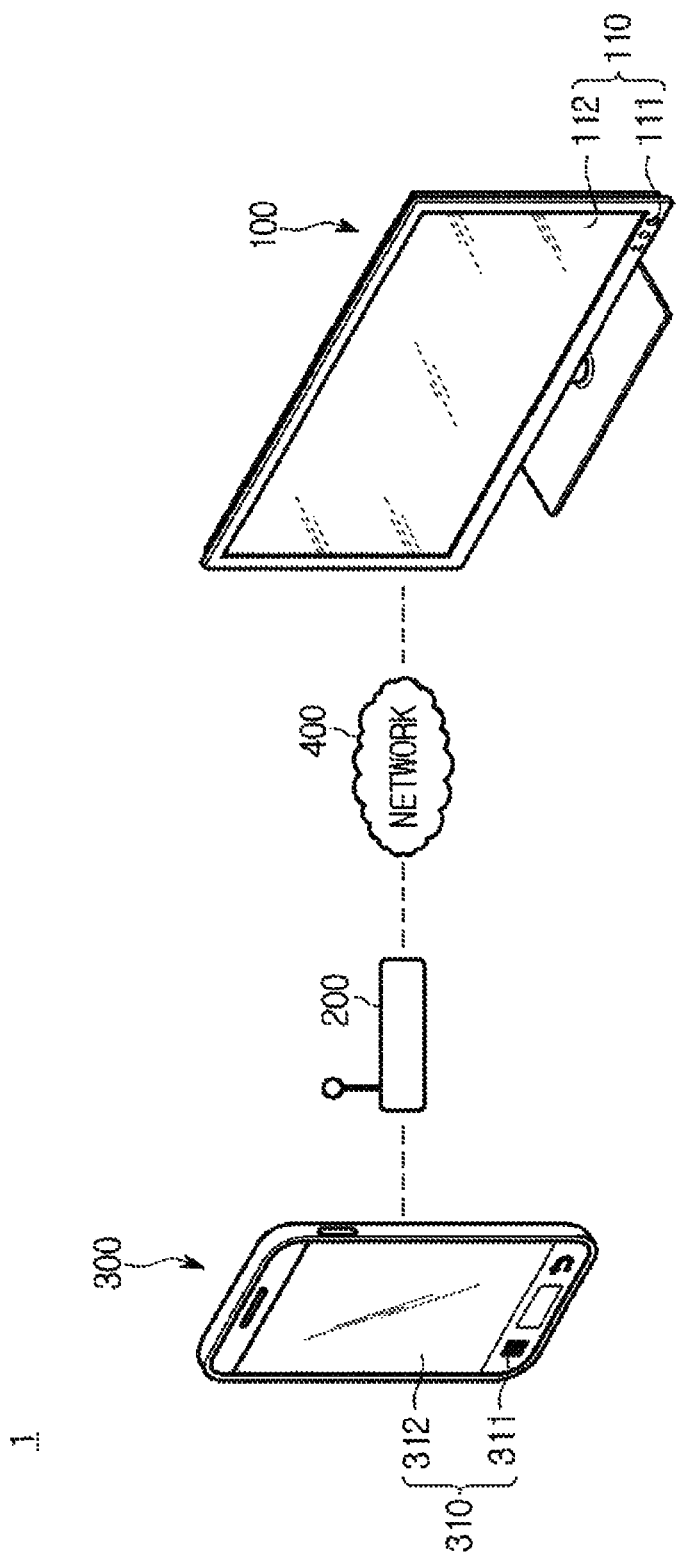
FIG. 1A shows a communication system having a device according to an exemplary embodiment.

Certain exemplary embodiments will now be described in greater detail with reference to the accompanying drawings.

In the following description, same drawing reference numerals are used for the same elements even in different drawings. The matters defined in the description, such as detailed construction and elements, are provided to assist in a comprehensive understanding of the invention. Thus, it is apparent that the exemplary embodiments can be carried out without those specifically defined matters. Also, well-known functions or constructions are not described in detail since they would obscure the invention with unnecessary detail.

FIG. 1A shows a communication system having a device according to an exemplary embodiment.

A communication system 1 may include a device 100, a repeater 200, and a terminal 300, which may be connected to one another over a wired and/or wireless network 400.

The device 100 may perform a predetermined function, and is capable of performing at least one of wired communication and wireless communication.

For example, the device 100 may be at least one of a television, a printer, an air conditioner, an audio device, a laptop, and a washing machine.

The device 100 may connect communication with the repeater 200 via wireless communication, and store connection information if communication has been successfully connected.

The device 100 may receive an operation command transmitted from the external terminal 300. The device 100 may receive the operation command transmitted from the terminal 300 through the repeater 200.

Upon reception of a wakeup command during a sleep mode of the device 100, the device 100 may perform wakeup operation and switch to an active mode. The sleep mode refers to a state in which power supply to at least a part of the device 100 is stopped. The active mode refers to a state in which power supply to the device 100 is normally performed. Power consumption in the sleep mode is smaller than that of the active mode.

The device 100 may receive a magic packet that includes the wakeup command.

The device 100 may perform wakeup operation based on the wakeup command included in the magic packet, and may also perform operation of setting a function based on operation information included in the magic packet.

The device 100 that receives the magic packet may be any device 100 connected with the terminal 300 over the network 400.

Alternatively, only some of the devices 100 connected to the terminal 300, which are chosen by the user, may receive the magic packet. For example, only one of the devices 100 connected to the terminal 300 may be chosen by the user to receive the magic packet.

The device 100 may determine whether communication with the repeater 200 is unavailable if the device 100 is currently in the sleep mode, and perform recovery of communication of a communication module (or communicator) of the device 100 if it is determined that the communication with the repeater 200 is unavailable.

Alternatively, the device 100 may perform recovery of communication of the communication module at preset intervals when the device 100 is currently in the sleep mode.

The preset interval may be a default interval set in a manufacturing stage of the device 100, or may be an interval set by the user.

Alternatively, the device 100 may determine if a current time corresponds to a preset time when the device 100 is in the sleep mode, and perform recovery of communication of the communication module if it is determined that the current time corresponds to the preset time.

The preset time may be a specific time set by the user.

The device 100 may stop operation of a load while operating only an operation module (or operator) of the device 100 that is used to recover communication of the communication module.

A user interface 110 may be provided by the device 100.

The user interface 110 may receive power on/off commands, a command to perform the sleep mode, a wakeup command, etc., and may also receive a time or interval to recover communication of the communication module.

The device 100 may switch a current mode to an active mode upon reception of the wakeup command in the sleep mode, and may switch a current mode to a sleep mode upon reception of the command to perform the sleep mode in the active mode.

The user interface 110 may include an input unit 111 and a display 112.

Alternatively, the device 100 may not include the user interface 110 but include only one of the input unit 111 and the display 112.

The input unit 111 may include various different buttons or switches, a pedal, a keyboard, a mouse, a track ball, various levers, a handle, a stick, or some hardware input devices for the user input.

The input unit 111 may also include a graphical user interface (GUI), i.e., a software input device, such as a touch panel for user input.

The display 112 may be implemented with a cathode ray tube (CRT), a digital light processing (DLP) panel, a plasma display panel (PDP), a liquid crystal display (LCD) panel, an electro luminescence (EL) panel, an electrophoretic display (EPD) panel, an electrochromic display (ECD) panel, a light emitting diode (LED) panel, an organic light emitting diode (OLED) panel, etc.

The user interface 110 may include a touch screen with a mutual-layered structure between a touch panel and a display panel.

The repeater 200 is a device capable of performing at least one of wired communication and wireless communication for relaying communications between the device 100 and the terminal 300.

The repeater 200 may include one of an access point (AP), a router, and a point to point device, which are capable of connecting wireless communication devices to wired devices using, for example, a wireless fidelity (Wi-Fi) and/or Bluetooth-related standard.

The repeater 200 receives the wakeup command transmitted from the terminal 300 when the device 100 is in the sleep mode, and transmits the received wakeup command to the device 100.

The wakeup command may be transmitted to the device 100 in the magic packet.

The magic packet may include the wakeup command to wake up the device 100 that is in the sleep mode, and operation information to set a function to be performed after a wakeup of the device 100.

The terminal 300 may transmit to the repeater 200 an operation command input by the user.

The terminal 300 may be of a type different from a type of the device 100, which may receive user commands, and the terminal 300 may be portable, and may be capable of performing at least one of wired communication and wireless communication.

For example, the terminal 300 may be a smart phone, a portable digital assistant (PDA), a tablet, a note book, or the like.

The terminal 300 may include various communication modules, such as wireless Internet modules, short range communication modules, mobile communication modules, etc.

The wireless Internet module may perform communication over an external network according to a communication protocol, such as wireless local area network (WLAN), Wi-Fi, wireless broadband (Wibro), world interoperability for microwave access (Wimax), high speed downlink packet access (HSDPA), etc.

The short-range communication module may perform communication with a device within a short distance according to a short-range communication scheme, such as Bluetooth, radio frequency identification (RFID), infrared data association (IrDA), ultra wideband (UWB), Zigbee, etc.

The mobile communication module may perform communication by accessing a mobile communication network based on various mobile communication standards, such as 3rd generation (3G), 3rd generation partnership project (3GPP), long term evolution (LTE), etc.

The terminal 300 may receive an operation command for the device 100, and may transmit the operation command to the repeater 200.

Furthermore, the terminal 300 may receive the operation information of the device 100 and output the operation information to the repeater 200.

The operation command may include a wakeup command to wake up the device 100.

Specifically, the terminal 300 may generate a magic packet, upon reception of the wakeup command for the device 100 or at a time set by the user, and may transmit the magic packet to the device 100.

The terminal 300 may determine a function to be performed by the device 100 after the device 100 is woken up, and may transmit the operation information in the magic packet to set the determined function in the device 100.

The user may input only a wakeup command or only a command to perform a function indicated by the operation information to the terminal 300, or may input the wakeup command along with the command to perform a function indicated by the operation information.

Accordingly, the terminal 300 may generate a magic packet that includes wakeup information and operation information based on the user's wakeup command and/or the command to perform a function.

Furthermore, the terminal 300 may generate a magic packet that includes wakeup information and operation information in response to a function command (i.e., command to perform the function) input by the user.

Moreover, the terminal 300 may generate a magic packet that includes wakeup information in response to a wakeup command input by the user.

The terminal 300 may select at least one device 100 to be remotely woken up based on the input by the user.

The user may select at least one device 100 to be woken up through the user interface 310 provided by the terminal 300.

The terminal 300 may include identification (ID) information of the selected device 100 in the magic packet. The identification information of the device 100 may include an address and/or ID information of the device 100.

Accordingly, the device 100 may determine whether a magic packet has been received from the terminal 300 based on the identification information included in the magic packet.

The magic packet generated by the terminal 300 may be transmitted to the selected device 100 to wake up or operate the device 100.

Furthermore, the user interface 310 may receive a specific time and/or interval at which communication of the communication module of the device 100 is to be recovered.

The user interface 310 of the terminal 300 may include an input unit 311 and a display 312.

The input unit 311 may include various different buttons or switches, a pedal, a keyboard, a mouse, a track ball, various levers, a handle, a stick, or some hardware input devices for the user input.

The input unit 311 may also include a graphical user interface (GUI), i.e., a software input device, such as a touch pad for the user input.

The display 312 may be implemented with a cathode ray tube (CRT), a digital light processing (DLP) panel, a plasma display panel (PDP), a liquid crystal display (LCD) panel, an electro luminescence (EL) panel, an electrophoretic display (EPD) panel, an electrochromic display (ECD) panel, a light emitting diode (LED) panel, an organic light emitting diode (OLED) panel, etc.

The user interface 310 may include a touch screen with a mutual-layered structure between a touch panel and a display panel.

Figure 1B:
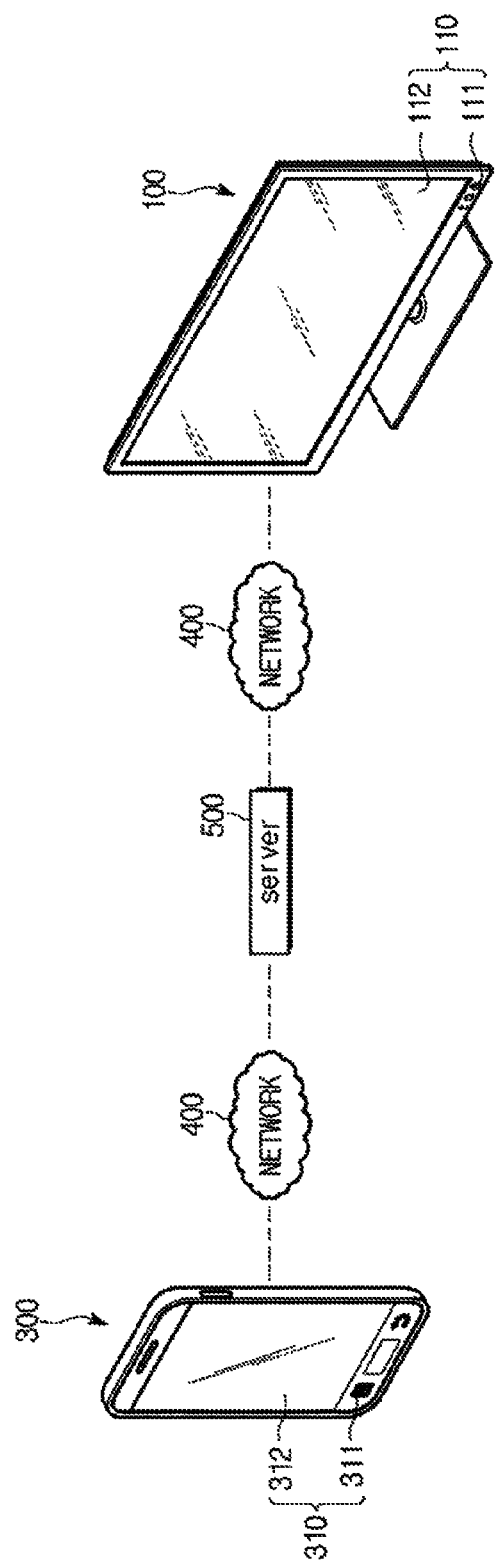
FIG. 1B shows a communication system having a device according to another exemplary embodiment.

FIG. 1B shows a communication system having a device according to another exemplary embodiment.

A communication system 1 may include a device 100, a server 500, and a terminal 300, which may be connected to one another over a wired and/or wireless network 400.

The descriptions of the same components as described above with respect to the previous exemplary embodiment will be omitted herein.

The device 100 may determine whether communication with the server 500 is unavailable if the device 100 is currently in the sleep mode, and perform recovery of communication of the communication module if it is determined that the communication with the server 500 is unavailable.

The device 100 may stop operation of a load while operating only the operation module in recovering communication of the communication module.

The device 100 may connect communication with the server 500 via wireless communication, and store information about the connection with the server 500 if communication has been successfully connected.

The server 500 may perform communication between the device 100 and the terminal 300 to transmit and/or receive information between the device 100 and the terminal 300.

The server 500 may receive a magic packet transmitted from the terminal 300, and transmit the magic packet to the device 100.

The magic packet may include at least one of a wakeup command and a command to perform a function.

The terminal 300 may generate the magic packet including the wakeup command and/or the command to perform a function, which is input by the user, and transmit the magic packet to the server 500.

The terminal 300 may also transmit a sleep mode command for the device 100 to the server 500.

Figure 2A:
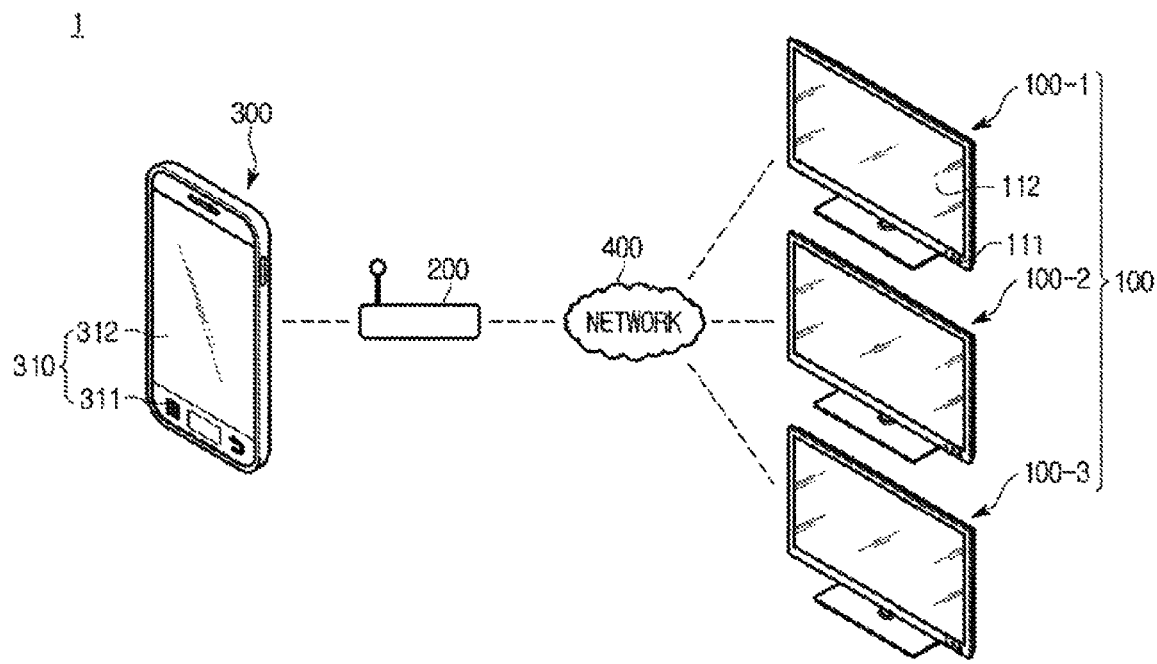
FIG. 2A shows a communication system having a device according to still another exemplary embodiment.
Figure 2B:
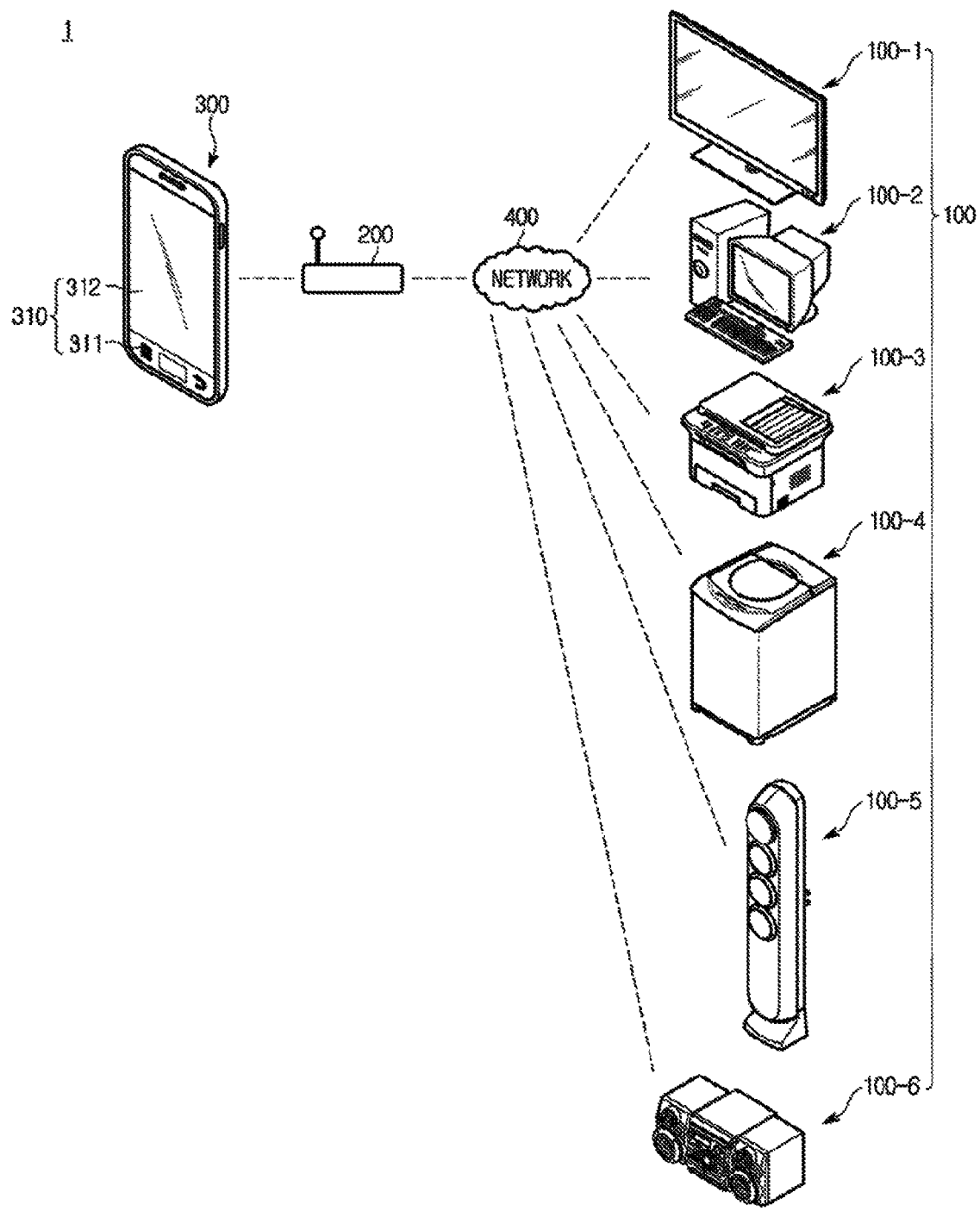
FIG. 2B shows a communication system having a device according to still another exemplary embodiment.

FIGS. 2A and 2B show communication systems having devices according to exemplary embodiments.

A communication system 1 may include a plurality of devices 100, a repeater 200, and a terminal 300, which may be connected over a wired and/or wireless network 400.

As shown in FIG. 2A, the plurality of devices 100 may include a first device 100-1, a second device 100-2, and a third device 100-3, which may be of different types of devices.

Furthermore, as shown in FIG. 2B, the plurality of devices 100 may include a first device 100-1, a second device 100-2, a third device 100-3, a fourth device 100-4, a fourth device 100-5, and a sixth device 100-6, which may be of different types of devices.

The plurality of devices 100 may be located within a certain range from the repeater 200, and may be connected to one another over the network 400.

The plurality of devices 100 shown in FIGS. 2A and 2B may be connected to the terminal 300 via communication, and may receive a magic packet from the terminal 30.

Alternatively, one of the plurality of devices 100, which is selected by the user, may receive a magic packet.

Alternatively, the plurality of devices 100 may receive the magic packet and one of the plurality of devices 100, which is selected by the user, may be woken up according to the magic packet. For example, when the user selects the second device 100-2, the second device 100-2 may be woken up according to the magic packet among the plurality of devices 100 that receive the magic packet.

Alternatively, the second device 100-2 selected by the user may receive the magic packet alone and may be woken up according to information in the magic packet.

Each of the plurality of devices 100 may determine whether communication with the repeater 200 is unavailable if the device is currently in the sleep mode, and perform recovery of communication of a communication module of the device 100 if it is determined that the communication with the repeater 200 is unavailable.

Alternatively, each device 100 may recover communication of the communication module of the device 100 at preset intervals when the device 100 is currently in the sleep mode.

The preset interval may be a default interval that is set in a manufacturing stage of the device, or may be an interval set by the user.

Alternatively, the device 100 may determine if the current time corresponds to a preset time when the device 100 is in the sleep mode, and perform recovery of communication of the communication module if it is determined that the current time corresponds to the preset time.

The preset time may be a specific time set by the user.

The device 100 may stop an operation of a load while operating an operation module in recovering communication of the communication module.

A user interface 110 may be provided in each device 100.

The user interface 110 may receive power on/off commands, a command to perform the sleep mode, a wakeup command, etc., and may also receive a time and/or interval at which communication of the communication module is to be recovered.

The device 100 may switch a current mode to an active mode upon reception of the wakeup command in the sleep mode, and may switch a current mode to a sleep mode upon reception of the command to perform the sleep mode in the active mode.

The repeater 200 may transmit a magic packet generated by the terminal 300 to at least one of the plurality of devices 100 connected thereto.

Alternatively, the server 500 as shown in FIG. 1B may replace the repeater 200 to perform communication between the plurality of devices 100 and the terminal 300.

The terminal 300 may receive a selection of at least one of the plurality of devices 100, generate a magic packet for the selected at least one device 100, and transmit the magic packet to the repeater 200 to transmit the magic packet to the selected at least one device 100.

If communication between the terminal 300 and at least one of the plurality of devices 100 is interrupted, the terminal 300 may output information about interruption of the communication with the at least one of the plurality of devices 100.

Figure 3:
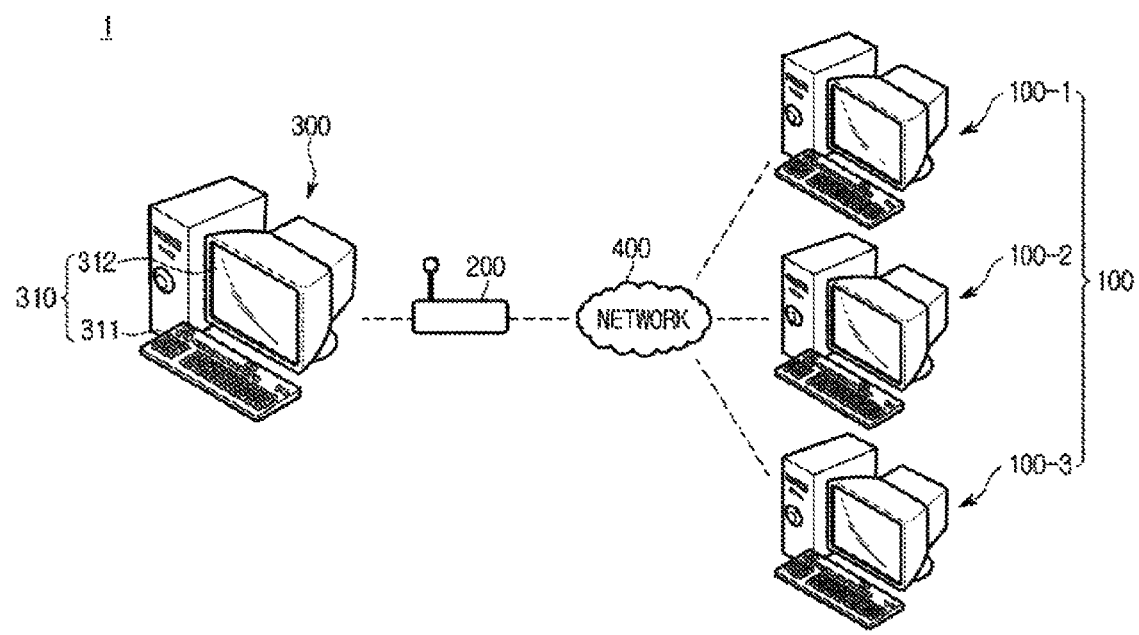
FIG. 3 shows a communication system having a device according to still another exemplary embodiment.

FIG. 3 shows a communication system having a device according to still another exemplary embodiment.

A communication system 1 may include a- plurality of devices 100, a repeater 200, and a terminal 300, which may be connected over a wired and/or wireless network 400.

The terminal 300 and the plurality of devices 100 may be of the same type of devices.

For example, the terminal 300 and the plurality of devices 100 may be implemented as computers.

For example, the devices 100 may include sub-computers 100-1, 100-2, and 100-3, and the terminal 300 may include a main computer for controlling the sub computers 100-1, 100-2, and 100-3.

At least one of the sub-computers 100-1, 100-2, and 100-3 may receive a signal of an operation command transmitted from the external main computer 300.

The at least one sub-computer 100-1, 100-2 or 100-3 may receive the operation command transmitted from the terminal 300 through the repeater 200 or the server.

The at least one sub-computer 100-1, 100-2 or 100-3 may receive a wakeup command during the sleep mode.

Specifically, the at least one sub-computer 100-1, 100-2 or 100-3 may receive a magic packet including the wakeup command, and enter an active mode based on the wakeup command included in the received magic packet.

Each sub-computer 100-1, 100-2 or 100-3 may determine whether communication with the repeater 200 is unavailable if the sub-computer 100-1, 100-2 or 100-3 is currently in the sleep mode, and recover communication of the communication module of the sub-computer 100-1, 100-2 or 100-3 if it is determined that the communication with the repeater 200 is unavailable.

Alternatively, each sub-computer 100-1, 100-2 or 100-3 may recover communication of the communication module at preset intervals when the device 100 is currently in the sleep mode.

Alternatively, the sub-computer 100-1, 100-2 or 100-3 may determine if the current time corresponds to a preset time when the sub-computer 100-1, 100-2 or 100-3 is in the sleep mode, and recover communication of the communication module of the sub-computer 100-1, 100-2 or 100-3 if it is determined that the current time corresponds to the preset time.

The sub-computer 100-1, 100-2 or 100-3 may stop operation of a load while operating the operation module in recovering communication of the communication module.

The repeater 200 is a device capable of performing at least one of wired communication and wireless communication for relaying communications between the plurality of sub-computers 100 and the main computer 300.

The repeater 200 may include one of an access point (AP), a router, and a point to point device, which are capable of connecting connect wireless communication devices to wired devices using a Wi-Fi and/or Bluetooth-related standard.

The repeater 200 may receive a wakeup command transmitted from the main computer 300 when the at least one sub-computer 100-1, 100-2 or 100-3 is in the sleep mode, and transmit the received wakeup command to the at least one sub-computer 100-1, 100-2 or 100-3.

The wakeup command may be transmitted to the device 100 in the magic packet.

The magic packet may include the wakeup command to wake up the device 100 in the sleep mode, and the operation information to set a function to be performed after a wakeup of the device 100.

The terminal 300 may transmit to the repeater 200 an operation command input by the user.

The terminal 300, which is the main computer, may receive an operation command for at least one sub-computer 100-1, 100-2 or 100-3, and may transmit the operation command to the repeater 200.

Furthermore, the main computer may receive operation information of the at least one sub-computer 100-1, 100-2 or 100-3 and output the operation information through the repeater 200.

The operation command may include a wakeup command to wake up the at least one of the sub-computers 100.

The main computer may receive a selection of at least one sub-computer 100-1, 100-2 or 100-3 to be remotely woken up based on an input by the user, generate a magic packet to wake up the selected at least one sub-computer 100-1, 100-2 or 100-3, and transmit the magic packet to the at least one sub-computer 100-1, 100-2 or 100-3.

The main computer 300 may output information of at least one of the plurality of sub-computers 100 if communication with the at least one sub-computer 100-1, 100-2 or 100-3 has been interrupted.

FIGS. 4, 5, 6, 7, 8A and 8B show magic packets transmitted from a terminal in communication with a device according to exemplary embodiments.

The terminal 300 included in any one of the communication systems 1 of FIGS. 1A, 1B, 2A, 2B, and 3 may generate and transmit a magic packet in the same or similar method as described above in the previous exemplary embodiments. Also, the magic packet generated by the terminal 300 may have the same or similar structure that is generated in the respective communication systems 1 of the previous exemplary embodiments.

A controller (not shown) in the terminal 300 may generate wakeup information, which includes a wakeup command to wake up the device 100 based on a selection of the user, and operation information to set a function to be executed by the device 100 that is woken up, and generate a magic packet to include the wakeup information and the operation information to the device 100.

In another exemplary embodiment, the wakeup information and the operation information may be included in different packets.

A structure of a magic packet P will now be described with reference to FIGS. 4 to 8B.

Figure 4:
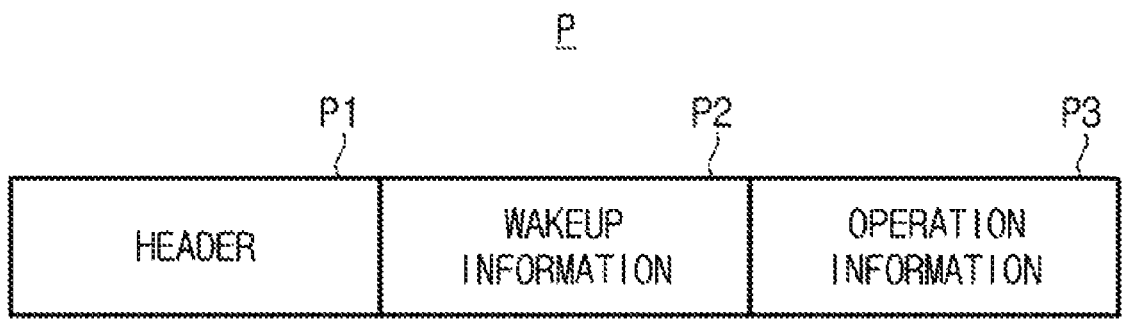
FIGS. 4, 5, 6, 7, 8A and 8B show magic packets transmitted from a terminal in communication with a device according to exemplary embodiments.

As shown in FIG. 4, the magic packet P may include a header P1, wakeup information P2, and operation information P3.

The header P1 may be generated based on a network scheme or protocol format between the terminal 300 and the device 100.

The wakeup information P2 may include a control command or control information to wake up the device 100 selected by the user, and the operation information P3 may include a control command or control information to set a function selected by the user after the device 100 is woken up.

Locations of the wakeup information P2 and operation information P3 may be interchangeable in the magic packet.

The operation information P3 may include an operation code per function of the device 100. That is, the operation information P3 may include an operation code which, when executed by the device 100, causes the device to perform a corresponding function.

For example, in a case that the device 100 is a smart television having a screen mirroring function, an all-share function, a second screen function, and the like, operation code 0 may be set to the screen mirroring function, operation code 1 may be set to the all-share function, and operation code 2 may be set to the second screen function.

Figure 5:
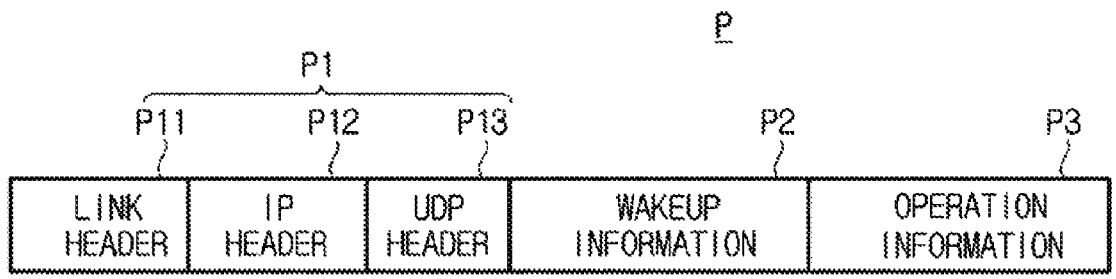

As shown in FIG. 5, the header P1 in the magic packet P may include a link header P11, an IP header P12, and a UDP header P13.

The header P1 may include address information of the repeater 200 and address information of at least one device 100 to receive the magic packet P.

In other words, if the magic packet includes address information of all the devices 100 connected to the terminal 300, the magic packet may be transmitted to all the devices 100.

If the magic packet includes address information of some of the devices 100 connected to the terminal 300, the magic packet may be transmitted to the devices 100 indicated by the address information.

The link header P11 may include medium access control (MAC) addresses or Ethernet addresses of the repeater 200 and the device 100. The IP header P12 may include Internet Protocol (IP) addresses of the repeater 200 and the device 100. The TCP header P13 may include port addresses of the repeater 200 and the device 100.

Figure 6:
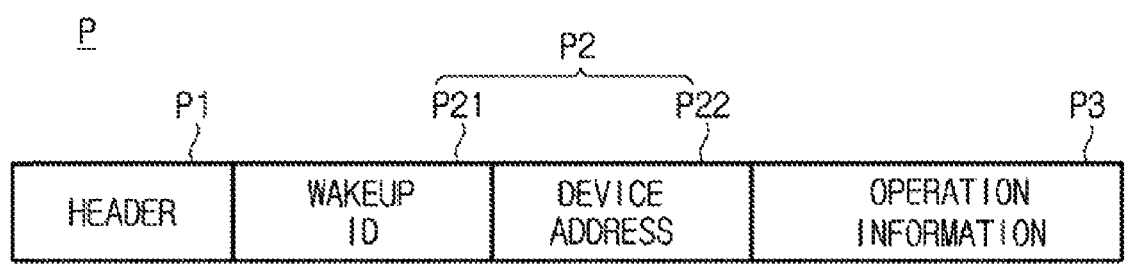

As shown in FIG. 6, the wakeup information P2 of the magic packet P may include a wakeup identification (ID) P21 and a device address P22.

The wakeup ID P21 corresponds to a wakeup control command, e.g., a control command to power on or to wake up the device 100 from the sleep mode, which may be implemented, but not exclusively, by wake on local area network (WOL), wake on wireless local area network (WoWLAN), etc.

The device address P22 refers to identification information of the device 100 to be woken up.

Specifically, the user may select the device 100 to be woken up, and based on the selection of the user, the identification information of the device 100, e.g., the MAC address of the device 100 may be included in the wakeup information P2 as the device address P22.

Locations of the wakeup ID P21 and device address P22 may be interchangeable in the magic packet.

Furthermore, the wakeup information P2 may be implemented according to a predetermined standard protocol, e.g., a predetermined standard protocol corresponding to the device 100 to be woken up.

Figure 7:
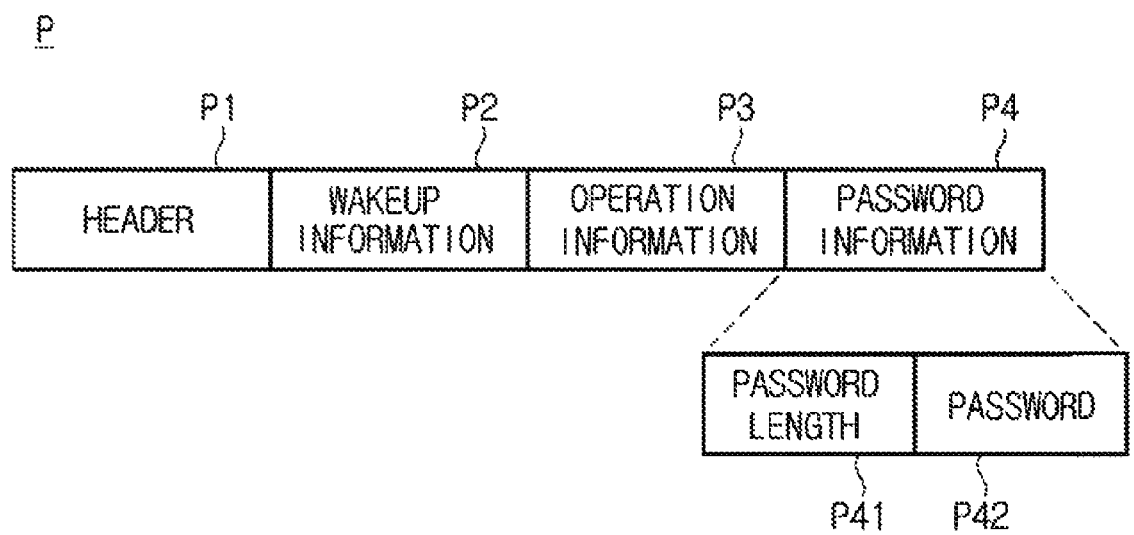

As shown in FIG. 7, the magic packet P may further include password information P4 in addition to the header P1, wakeup information P2, and operation information P3.

The password information P4 may include a field of password length P41, and a field of a password P42.

The password length P41 refers to a length of the set password P42, and may have a value ranged from 0 to 16. If the password length P41 has value 0, it means that there is no set password P42. The field of password length P41 may be, for example, 1 byte long.

The password P42 may be a password for performing wakeup operation, or a password for performing function setting operation.

Alternatively, separate passwords for performing wakeup operation and function setting operation may exist. In other words, the password P42 may be implemented with multiple passwords.

If the password P42 is a password for performing wakeup operation, the device 100 may be woken up in response to an input of the set password, and if the password P42 is a password for performing function setting operation, the device 100 may perform the function setting operation in response to an input of the set password.

Locations of the operation information P3 and password information P4 may be interchangeable in the magic packet.

Figure 8A:
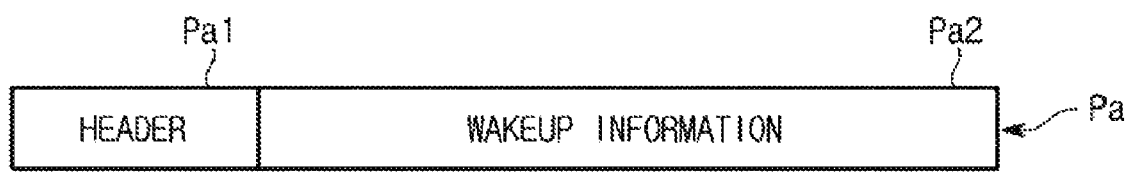
Figure 8B:
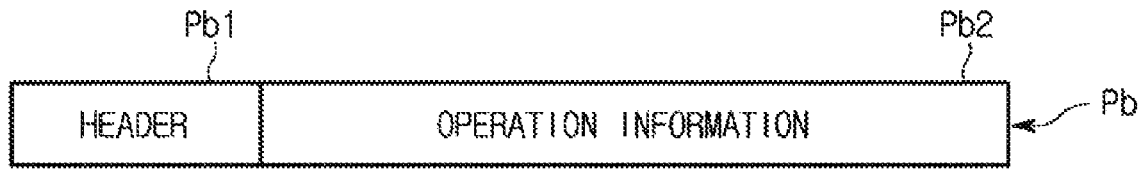

As shown in FIGS. 8A and 8B, the magic packet may include a first packet Pa and a second packet Pb.

The first packet Pa of the magic packet, which is a packet having a wakeup command, includes a header Pa1 and wakeup information Pa2, and may further include password information.

The second packet Pb of the magic packet, which is a packet having a command to perform a function (or set a function to be performed), includes a header PH and operation information Pb2, and may further include password information.

The password information of the first packet Pa may be for performing wakeup operation, and the password information of the second packet Pb may be for performing function setting operation.

The password information included in the first packet Pa and the password information included in the second packet Pb may or may not be the same.

Figure 9:
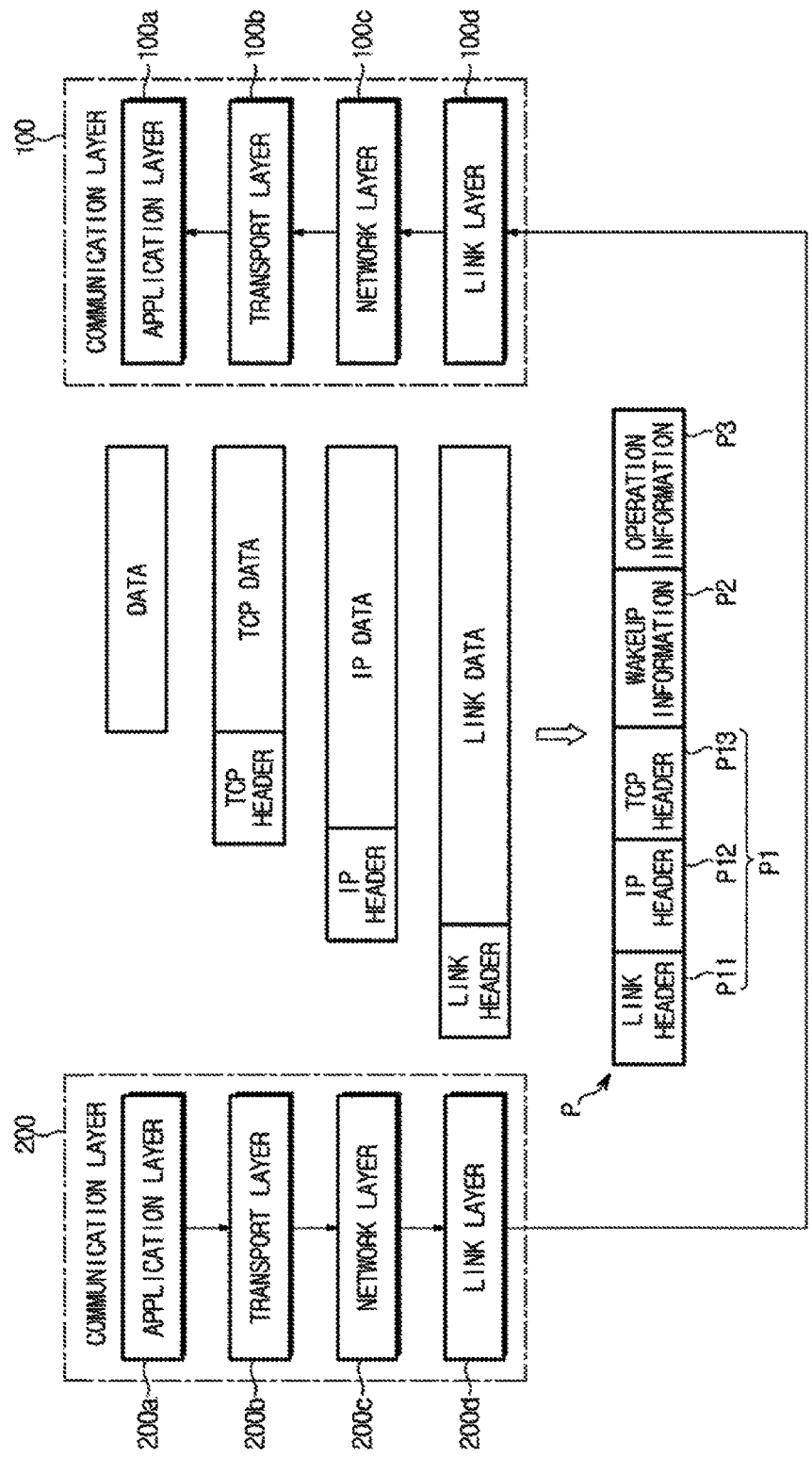
FIG. 9 shows a layered communication structure between a device and a repeater according to an exemplary embodiment.

FIG. 9 shows a layered communication structure between the device 100 and the repeater 200 according to an exemplary embodiment.

The layered communication structure between the device 100 and the repeater 200 may include application layers 100a, 200a, transport layers 100b, 200b, network layers 100c, 200c, and link layers 100d, 200d, and the corresponding layers in the device 100 and the repeater 200 are communicatively coupled to each other.

The device 100 includes the application layer 100a, the transport layer 100b, the network layer 100c, and the link layer 100d, and the repeater 200 includes the application layer 200a, the transport layer 200b, the network layer 200c, and the link layer 200d.

The magic packet P may pass the multiple layers 200a to 200d included in the repeater 200 to be transmitted to the device 100.

The application layer 200a generates data for transmission based on the received magic packet.

The data for transmission may include wakeup information and operation information. Furthermore, the application layer 200a may also serve to convert a format of the generated data to fit in a format corresponding to the device 100.

The data that has passed the application layer 200a is combined with another data in the transport layer 200b, resulting in transport layer data, e.g., transmission control protocol (TCP) data.

The transport layer 200b attaches a header to the transport layer data.

For example, as shown in FIG. 5, the data that is output from the application layer 200a and passes the transport layer 200b may have a TCP packet format in which a TCP header and the TCP data are combined.

The data that has passed the transport layer 200b is combined with another data in the network layer 200c, resulting in network layer data, e.g., internet protocol (IP) data.

The network layer 200c attaches a header to the network layer data.

For example, a TCP packet that is output from the transport layer 200b and passes the network layer 200c may be converted into an IP packet format where an IP header and the IP data are combined.

The data that has passed the network layer 200c is combined with another data in the link layer 200d, resulting in link data layer.

The network layer 200c attaches a header to the link layer data.

The header of the link layer may have e.g., a MAC header format, or an Ethernet header format.

In this manner, the magic packet P may be generated while passing through the application layer 200a, the transport layer 200b, the network layer 200c, and the link layer 200d of the repeater 200, and the final magic packet P may include data having the wakeup information P2 and the operation information P3, and the header P1 having a link header P11, an IP header P12, and a TCP header P13, as shown in FIG. 5.

The magic packet P received by the communication module of the device 100 may pass the plurality of layers 100a, 100b, 100c, and 100d included in the device 100.

Figure 10:
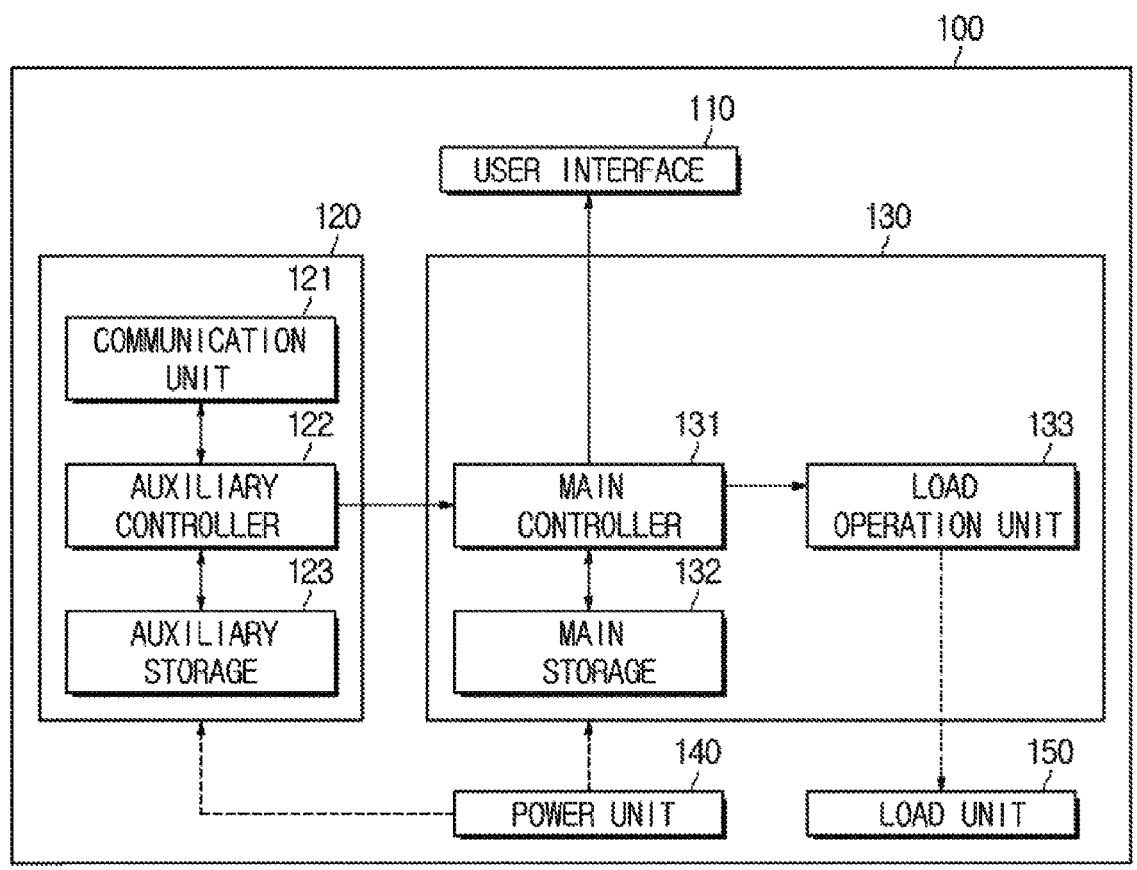
FIG. 10 is a control block diagram of a device, according to an exemplary embodiment.

FIG. 10 is a control block diagram of a device according to an exemplary embodiment.

The device 100 corresponds to any one of the devices 100 included in the communication systems of FIGS. 1A, 1B, 2A, 2B, and 3, and may perform the same function as described above in the previous exemplary embodiments.

The device 100 may include a user interface 110, a communication module 120, an operation module 130, a power unit 140, and a load unit 150.

The device 100 may perform an active mode to perform at least one function when a power button of the device 100 is on while commercial power is supplied, and perform a sleep mode when the power button is off while commercial power is supplied.

The device 100 may enter the sleep mode upon reception of a command to enter into the sleep mode during an active mode, and perform an active mode for performing at least one function selected by the user upon reception of a wakeup command during the sleep mode.

The device 100 may supply power only to the communication module 120 to consume less power during the sleep mode, and supply operation power to all of the components 110, 120, 130, 150 during the active mode.

The user interface 110 may receive an operation command from the user and displays operation information corresponding to the received operation command.

The user interface 110 may receive a command to enter into the sleep mode, a wakeup command, a command to perform a function, and a function adjustment command, and the user interface 110 display operation information of the device 100 corresponding to the received operation command.

The operation information may be information associated with performing a function corresponding to the received operation command.

The user interface 110 may indicate mode information and communicative connection information.

The communicative connection information may include information about a status of communicative connection with the repeater 200 and information about the repeater 200.

The status of communicative connection may be indicated by turning on or off an LED, or indicated in an image with a notice (or message). For example, the information about the repeater 200 may be indicated in an image with a notice (or message).

The mode information may be indicated by color of an LED. For example, if the device 100 is in the sleep mode, the LED may emit red light, and if the device is in the active mode, the LED may emit green light.

The user interface 110 may also receive information about a function to be performed after the device 100 is woken up, upon reception of the wakeup command.

The communication module 120 may include at least one of various communication modules, e.g., a wireless Internet module, a short range communication module, and a mobile communication module.

The communication module 120 may perform communication between the repeater 200 and the operation module 130 of the device 100, and perform operation of transmission and/or reception of information based on a control command from the operation module 130. Particularly, upon reception of the wakeup command during the sleep mode, the communication module 120 may transmit the wakeup command to the operation module 130.

The communication module 120 may determine whether a current condition corresponds to a wakeup condition of the operation module 130 while the device 100 is in the sleep mode.

The wakeup condition includes a state in which communication with the repeater 200 is not available.

Specifically, the communication module 120 may transmit the wakeup command to the operation module 130 if it is determined that communication with the repeater 200 is not available while the device 100 is in the sleep mode.

In addition to transmitting the wakeup command, the communication module 120 requests the operation module 130 to recover communication by transmitting a command to recover communication (or recover communication command).

The communication module 120 may perform at least one of wired communication and wireless communication.

The communication module 120 may include a communication unit 121, an auxiliary controller 122, and an auxiliary storage 123.

The communication unit 121 may perform communication between the repeater 200 and the auxiliary controller 122.

The communication unit 121 may receive at least one magic packet transmitted through the repeater 200.

The communication unit 121 may also receive a packet for performing a function, which is transmitted from the remote terminal 300, through the repeater 200.

The communication unit 121 may also transmit information transmitted from the operation module 130 to the repeater 200, and the repeater 200 transmits the information to the terminal 300.

The auxiliary controller 122 may determine a current mode of the operation module 130, determine whether a device address included in the operation information in a received packet to perform a function corresponds to identification information stored within the device 100, upon reception of the packet during an active mode, and determine whether to transmit an operation command that corresponds to the operation information based on determination of whether the device address corresponds to the identification information.

The auxiliary controller 122 may determine whether a device address included in wakeup information in a magic packet corresponds to identification information of the device 100, upon reception of the magic packet while the device 100 is in the sleep mode, and determine whether to transmit the wakeup operation based on the determination of whether the device address corresponds to the identification information.

The auxiliary controller 122 may determine if communication with the repeater 200 is not available while the device is in the sleep mode, transmit the wakeup command to the operation module 130 if it is determined that communication with the repeater 200 is not available, and transmit a recover communication command to the operation module 130 which is woken up.

The auxiliary controller 122 may transmit the wakeup command together with the recover communication command, and may additionally transmit a command to stop operation of a load.

Determining that communication with the repeater 200 is not available may include, for example, determining interruption of communication with the repeater 200, poor security status, occurrence of an error in the communication module 120, and interruption of communication with the server 500.

The interruption of communication with the repeater 200 may include, for example, a communication interruption state due to initialization of the repeater 200, and a disconnected state between the corresponding communication layers between the device 100 and the repeater 200.

The poor security status may include, for example, authentication delinquency and security key update delinquency.

Authentication delinquency refers to a state where an unauthorized user has attempted to access to the repeater 200 more than a predetermined number of times, which may be informed by the repeater 200.

The security key update delinquency refers to a state where a security key of the repeater 200 is being updated slower than a predetermined time, which is determined by the auxiliary controller 122.

The auxiliary controller 122 may recover communication according to communication recovery control operation performed by the operation module 130.

Communication recovery may include connection between the corresponding communication layers of the device 100 and the repeater 200.

The auxiliary storage 123 may store at least one identification information among address and an ID of the device 100.

The auxiliary storage 123 may also store communication information of the repeater 200.

The operation module 130 may operate the communication module 120 and the load unit 150 based on information input to the user interface 110.

The operation module 130 may include a main controller 131, a main storage 132, and a load operation unit 133.

The main controller 131 may control operation of the load unit 150 based on information input to the user interface 110, control operation information of the load unit 150 to be displayed in the user interface 110, and control the active mode or the sleep mode based on information input to the user interface 110.

Furthermore, the main controller 131 may control the active mode or the sleep mode based on an operation command transmitted from the communication module 120.

The main controller 131 may control the communication module 120 to recover communication, upon reception of the recover communication command transmitted from the communication module 120.

The main controller 131 may perform wakeup operation when the communication module receives the wakeup command during the sleep mode, and control operation of the load unit 150 based on the operation information.

When the communication module receives the wakeup command and the recover communication command during the sleep mode, the main controller 131 may perform wakeup operation and control the communication module 120 to recover communication while controlling the load unit 150 to stop operation.

Communication recovery performed by the communication module 120 may include connection between the corresponding communication layers of the device 100 and repeater 200.

The main storage 132 may store a computer program for recovery of communication to be executed by the communication module 120. The main storage 132 may also store a password for the repeater 200.

The load operation unit 133 may operate various loads of the load unit 150 based on a command from the main controller 131.

The power unit 140 may be connected to an outside commercial power source and supplied with the commercial power, and may adjust components to which power is supplied and a magnitude of the supplied commercial power so that the adjusted power is supplied as operating power to the respective elements of the device 100.

The power unit 140 may supply operation power to all the elements of the device 100 if the device 100 is in the active mode, or only to the communication module 120 if the device 100 is in the sleep mode.

The load unit 150 includes various loads and performs a preset function using the power supplied from the power unit 140 based on an operation command transmitted from the operation module 130.

For example, loads of a television may include a display panel and a speaker; loads of a computer may include a monitor, a fan motor, etc.; loads of an air conditioner may include a compressor, a fan motor, etc.

The main storage 132 and the auxiliary storage 123 may temporarily or non-temporarily store data and programs for operation of the device 100.

For example, the auxiliary storage 123 may store a magic packet received from the terminal 300, and address information and identification information of the device 100, and the main storage 132 may store operation codes for respective functions of the device 100 in advance.

The main storage 132 and the auxiliary storage 123 may include storage media of at least one type of flash memory, hard disk, multimedia card micro type memory, card type memory (e.g., a secure digital (SD) or an extreme digital (XD) memory), a random access memory (RAM), a static random access memory (SRAM), a read-only memory (ROM), an electrically erasable programmable read-only memory (EEPROM), a programmable read-only memory (PROM), a magnetic memory, a magnetic disk, and an optical disk.

The device 100 may operate a web storage that serves as a memory on the Internet.

The main controller 131 and the auxiliary controller 122 may include a central processing unit (CPU), a micro controller unit (MCU), or a processor.

Figure 11:
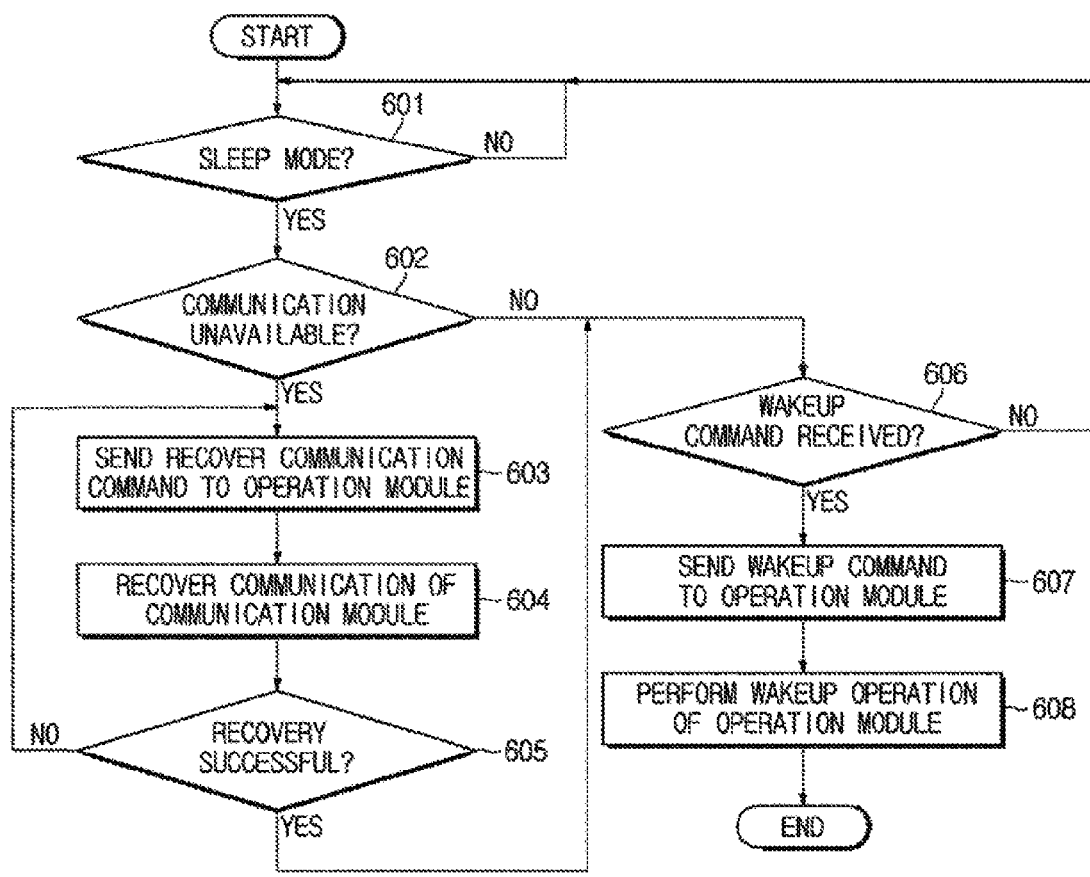
FIG. 11 is a flowchart of controlling a device, according to an exemplary embodiment.

FIG. 11 is a flowchart of controlling a device, according to an exemplary embodiment.

A device wakes up an operation module of the device and performs an active mode, if a power button of the device is on while commercial power is supplied, if a wakeup command is received through a repeater during the sleep mode, or if the wakeup command is received through a remote controller (not shown) during a sleep mode.

The device performs the sleep mode, if a power button of the device is off while commercial power is supplied, if a command to perform the sleep mode is received through the repeater during an active mode, or if the command to perform the sleep mode is received through the remote controller during an active mode.

An operation module of the device enables power to be supplied only to a communication module and instructs the communication module to perform the sleep mode when the device is currently in the sleep mode.

The communication module of the device may determine if the device is currently in the sleep mode in operation 601. If it is determined that the device is currently in the sleep mode, the communication module determines if communication with the repeater 200 is unavailable in operation 602.

Determining if communication with the repeater 200 is unavailable includes, for example, determining if communication with the repeater 200 has been interrupted, determining if communication is unavailable due to poor security, and determining if communication is unavailable because of occurrence of an error in the communication module.

The poor security refers to a state in which a security key is updated slower than a predetermined time.

Determining if communication with the repeater 200 is unavailable includes, for example, determining if information about poor security has been received from the repeater 200.

The poor security is a state where an unauthorized user has attempted to access more than a predetermined number of times, which may be informed by the repeater.

If it is determined that communication with the repeater 200 is unavailable, the communication module of the device requests recovery of communication by transmitting a wakeup command and a recover communication command to an operation module, in operation 603.

Upon reception of the wakeup command and recover communication command, the operation module of the device performs wakeup operation and recover communication of the communication module, in operation 604.

Recovery of communication of the communication module may include recovering a connection status between the corresponding communication layers in the layered communication structures of the repeater and the device.

Upon reception of the wakeup command and the recover communication command, the operation module may control the power unit 140 to supply power to a component related to recovering communication of the communication module while blocking the power from being supplied to other components.

For example, in a case that a communication module provided in a television is to be recovered, the television controls to supply power to the operation module and the communication module, while controlling not to supply power to a display for displaying images and a speaker for outputting sound.

The communication module of the device checks communicative connection to the repeater during recovery of communication, and transmits information about the result of checking communicative connection to the operation module. Specifically, the communication module transmits recovery success information to the operation module if it is determined that communication with the repeater becomes available, and transmits recovery failure information to the operation module if it is determined that communication with the repeater is unavailable.

Transmitting the recovery failure information to the operation module includes transmitting again a recover communication command to the operation module.

The operation module of the device enters into the sleep mode if it is determined that communication of the communication module has been successfully recovered in operation 605.

The operation module of the device cuts off power to the components related to recovering communication of the communication module while maintaining power to the communication module.

The operation module of the device performs recovery of communication of the communication module again, if it is determined that recovery of communication has been failed, i.e., if the recover communication command is received again from the communication module.

Furthermore, the operation module of the device may also control output of information about an error in communicative connection to the repeater, if the communication recovery operation has been performed more than a predetermined number of times.

Outputting the information about an error in communication may be implemented by turning on an LED equipped in the device, or by displaying a notice on a display provided in the device while the user directly or indirectly manipulates the device.

The communication module 120 of the device determines whether the wakeup command has been received from the repeater when communication with the repeater is available, in operation 606, and transmits the wakeup command to the operation module 130 in operation 607 if it is determined that the wakeup command has been received.

Determining whether the wakeup command has been received includes determining whether the magic packet has been received and determining whether the magic packet includes wakeup information having the same identification of the device.

Specifically, the communication module determines whether a device address included in the wakeup information in the magic packet corresponds to identification information of the device, upon reception of the magic packet while the device is in the sleep mode, and determines whether to transmit the wakeup command to the operation module based on the determination of whether the device address corresponds to the identification information of the device.

Furthermore, the communication module may check operation information in the magic packet and transmit the operation information or operation command to the operation module 130.

Accordingly, a function requested by the remote user to be performed in the device.

The operation module 130 performs wakeup operation in operation 608, upon reception of the wakeup command, and then performs an active mode.

A sequence of performing the wakeup operation and active mode of the device will now be described in more detail.

The device 100 receives a packet from the terminal 300 through the repeater 200, and checks if the received packet includes a wakeup ID to determine whether the received packet is a magic packet.

The device 100 separates the header from the received packet and reads data. The device 100 determines if the data includes an wakeup ID implemented by, for example, WOL, WoWLAN, etc.

If the wakeup ID is not included in the data, the device 100 determines that the received packet is not a magic packet.

Otherwise, if the wakeup ID is included in the data, the device 100 determines that the received packet is a magic packet and determines whether a device address of the received magic packet corresponds to identification information of the device.

If the device address of the magic packet corresponds to the identification information of the device, the device 100 performs wakeup operation based on the wakeup ID.

After performing wakeup operation, the device 100 performs function setting operation to set a function to be executed based on operation information in the received magic packet.

Furthermore, if the magic packet includes password information, the device 100 determines whether a password length included in the password information corresponds to zero. That is, it is determined whether there exists a set password.

If the password length does not correspond to zero, the device 100 receives an input password and determines whether the input password corresponds to the password in the magic packet, i.e., the password included in the password information.

The input password may be input directly by the user through the user interface 110, or may be automatically set by the device 100.

If the input password corresponds to the password included in the password information, the device 100 performs function setting operation to set a function to be executed based on operation information in the received magic packet. In other words, the device 100 performs wakeup operation, determines whether passwords match, and performs function setting operation if the passwords match.

If the password is zero long, the device 100 performs function setting operation after performing wakeup operation.

A control diagram of the device in another exemplary embodiment is the same as that of the previous exemplary embodiment, and the description thereof will be omitted herein.

A communication module of the device in another exemplary embodiment determines if the current condition corresponds to a wakeup condition, and transmits the wakeup command and recover communication command to an operation module if the current condition is determined to correspond to the wakeup condition.

The wakeup condition is about communication recovery time of the communication module, which may be set by the user or based on a preset interval of communication recovery.

The communication recovery time may be input by the user through the user interface or may be stored in the auxiliary storage 123.

As such, maintaining communicative connection of the device by recovering communication of the communication module at a time set in advance by the user may allow the user to transmit the wakeup command and operation command at a desired time through the terminal 300.

By allowing the user to transmit an operation command at a time desired by the user, user convenience and satisfaction may be improved.

The communication recovery interval of the wakeup condition may be information set in the manufacturing stage of the device 100.

A control sequence in accordance with another exemplary embodiment will now be described in connection with FIG. 12.

Figure 12:
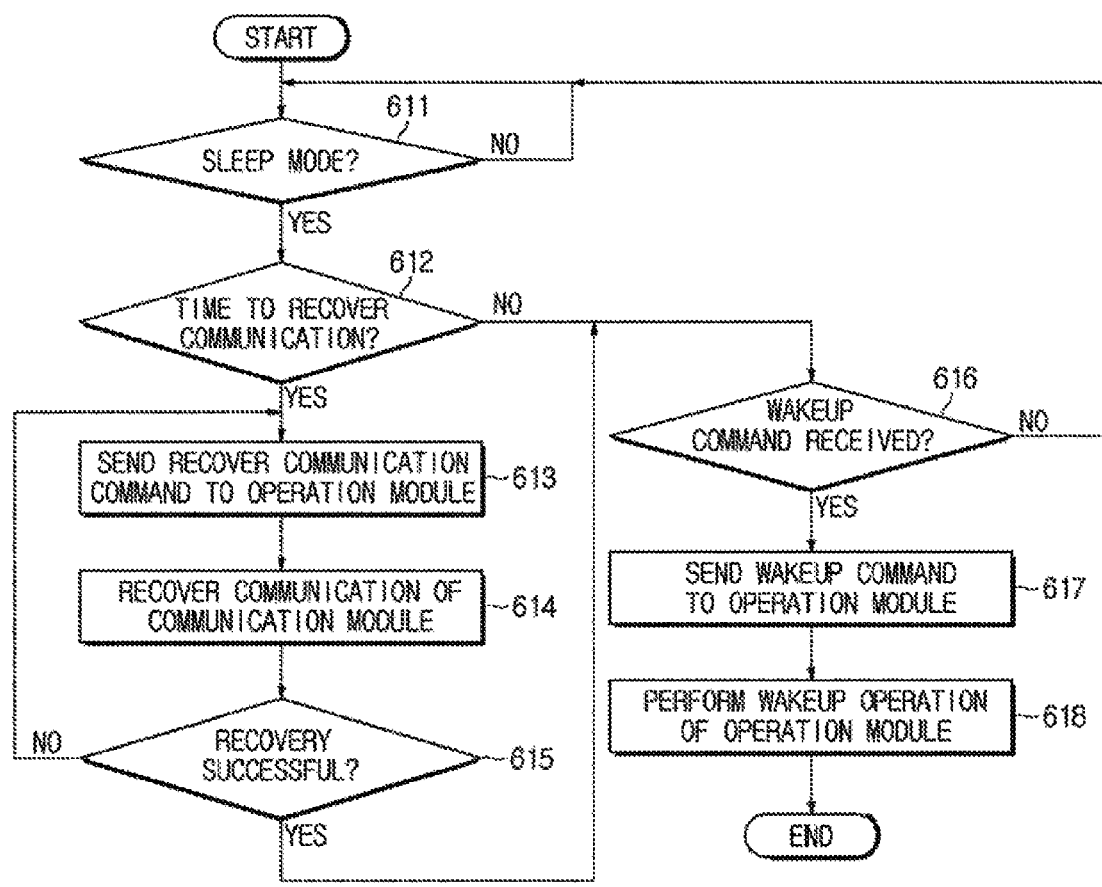
FIG. 12 is a flowchart of controlling a device, according to another exemplary embodiment.

FIG. 12 is a flowchart of controlling a device, according to another exemplary embodiment.

The device performs the sleep mode, if a power button of the device is off while commercial power is supplied, if a command to perform the sleep mode is received through the repeater during an active mode, or if the command to perform the sleep mode is received through the remote controller during an active mode.

An operation module of the device enables power to be supplied only to a communication module and provides the communication module with information to perform the sleep mode when the device is currently in the sleep mode.

The communication module of the device determines if the device is currently in the sleep mode in operation 611. If it is determined that the device is currently in the sleep mode, the communication module determines if it is time to recover communication in operation 612.

The communication recovery time may be set by the user, or may be based on an interval set in advance.

If it is time to recover communication, the communication module of the device requests communication recovery by transmitting a wakeup command and a recover communication command to an operation module, in operation 613.

Upon reception of the wakeup command and recover communication command, the operation module of the device performs wakeup operation and recover communication of the communication module, in operation 614.

Recovery of communication of the communication module may include recovering connection between the corresponding communication layers in the layered communication structure between the repeater and the device.

Upon reception of the wakeup command and the recover communication command, the operation module may control the power unit 140 to supply power to a component related to recovering communication of the communication module while blocking the power from being supplied to unnecessary components.

The communication module of the device checks communicative connection to the repeater during recovery of communication, and transmits information about the result of checking communicative connection to the operation module.

Specifically, the communication module transmits recovery success information to the operation module if it is determined that communication with the repeater is available, and transmits recovery failure information to the operation module if it is determined that communication is unavailable.

Transmitting the recovery failure information includes transmitting a recover communication command.

The operation module of the device enters into the sleep mode if it is determined that communication of the communication module has been successfully recovered in operation 615.

The operation module of the device cuts off power to the components related to recovering communication of the communication module while maintaining power to the communication module.

The operation module of the device again performs recovery of communication of the communication module, if it is determined that recovery of communication has been failed, i.e., if the recover communication command has been received again from the communication module.

Furthermore, the operation module of the device may also control output of information about an error in communicative connection to the repeater, if the communication recovery operation has been performed more than a predetermined number of times.

Outputting the information about an error in communication may be implemented by turning on an LED equipped in the device, or by displaying a notice on a display provided in the device while the user directly or indirectly manipulates the device.

The communication module 120 of the device determines whether the wakeup command has been received from the repeater when communication with the repeater is available, in operation 616, and transmits the wakeup command to the operation module 130 in operation 617 if it is determined that the wakeup command has been received.

Determining whether the wakeup command has been received includes determining whether the magic packet has been received and determining whether the magic packet includes wakeup information having the same identification of the device.

Specifically, the communication module determines whether a device address included in the wakeup information in the magic packet corresponds to identification information of the device, upon reception of the magic packet while the device is in the sleep mode, and determines whether to transmit the wakeup command based on the determination of whether the device address corresponds to the identification information.

Furthermore, the communication module may check operation information in the magic packet and transmit the operation information or operation command to the operation module 130.

This enables a function requested by the remote user to be performed in the device.

The operation module 130 performs wakeup operation in operation 618, upon reception of the wakeup command, and then performs an active mode.

Furthermore, the communication module of the device may transmit the wakeup command and the recover communication command to the operation module 130 at predetermined intervals during the sleep mode, and may skip a process of determining whether communicative connection with the repeater is successful in response to completion of the communication recovery operation.

In this regard, upon completion of the communication recovery operation, the operation module of the device may skip the process of determining whether the communicative connection with the repeater is successful, and enter into the sleep mode.

Figure 13:
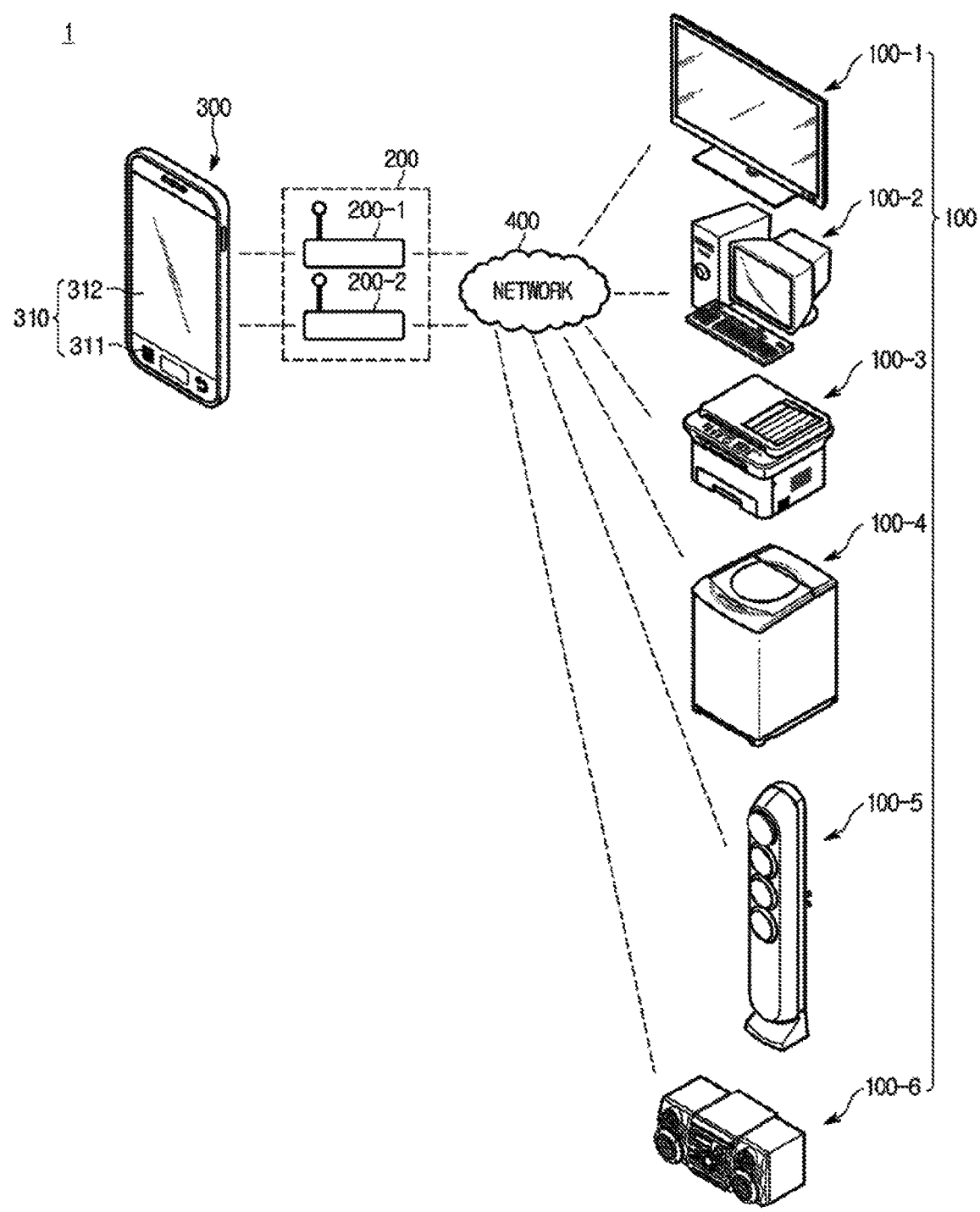
FIG. 13 is a diagram illustrating control of a device, according to another exemplary embodiment.

FIG. 13 is a diagram illustrating control of a device in a communication system, according to an exemplary embodiment.

A communication system 1 may include a plurality of devices 100, a plurality of repeaters 200, and a terminal 300, which may be connected over a wired and/or wireless network 400.

In a case where a communication area in which a plurality of devices communicate each other is large or a large number of devices communicate with each other, a plurality of repeaters may be provided.

The plurality of devices 100 may include a first device 100-1, a second device 100-2, a third device 100-3, a fourth device 100-4, a fifth device 100-5, and a sixth device 100-6, which may be of different types of devices or may be of the same type of devices.

The plurality of devices 100 may each select any of the plurality of repeaters and communicate with the terminal 300 through the selected repeater.

The plurality of devices 100 may receive magic packets from the terminal 300 while communicating with the terminal 300 through the repeaters 200.

Alternatively, one of the plurality of devices 100, which is selected by the user, may receive a magic packet.

The plurality of devices may each include an operation module and a communication module, as shown in FIG. 10.

The plurality of repeaters 200 may include a first repeater 200-1 and a second repeater 200-2, which relay communications between the plurality of devices 100 and the terminal 300.

The first and second repeaters 200-1 and 200-2 may selectively communicate with at least one of the plurality of devices 100.

Each device may check the status of communication between the communication module of the device and the first repeater 200-1 when the device is currently in the sleep mode, recover communication of the communication module by waking up the operation module of the device if it is determined that communication between the device and the first repeater 200-1 is unavailable, and attempt to connect communication with the second repeater 200-2 if communication with the first repeater 200-1 is unavailable even after communication of the communication module is recovered.

Alternatively, each device may recover communication of the communication module at preset intervals when the device 100 is currently in the sleep mode.

The preset interval may be a default interval set in a manufacturing stage of the device, or may be an interval set by the user.

Alternatively, the device 100 may determine if the current time corresponds to a preset time when the device 100 is in the sleep mode, and perform recovery of communication of the communication module if it is determined that the current time corresponds to the preset time.

The preset time may be a time set by the user.

The device 100 may stop operation of a load while operating an operation module in recovering communication of the communication module.

The device 100 may convert a current mode to an active mode upon reception of the wakeup command in the sleep mode, and may convert a current mode to a sleep mode upon reception of the command to perform the sleep mode in the active mode.

The repeater 200 may transmit a magic packet generated by the terminal 300 to at least one of the plurality of devices 100 connected thereto.

The device may attempt to establish communicative connection with the server 500 if communication with the first repeater 200-1 or the second repeater 200-2 is unavailable.

The terminal 300 may receive a selection of at least one of the plurality of devices 100, generate a magic packet for the selected at least one device, and transmit the magic packet to the repeater 200 to be transmitted to the at least one device.

If communication with at least one of the plurality of devices 100 is interrupted, it is also possible for the terminal 300 to output information about the at least one device.

Figure 14:
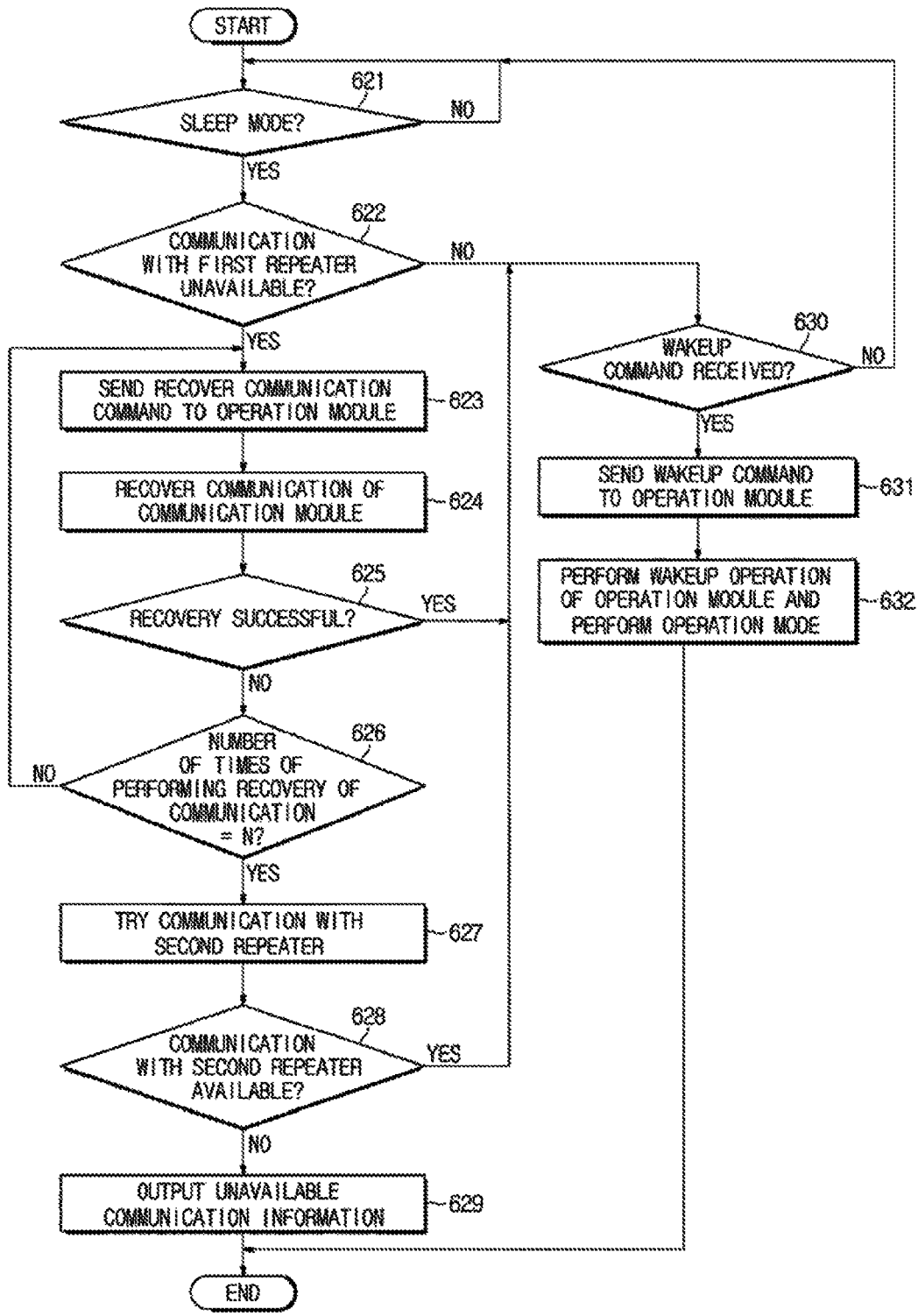
FIG. 14 is a flowchart controlling a device, according to still another exemplary embodiment.

FIG. 14 is a flowchart controlling a device, according to still another exemplary embodiment.

The device performs the sleep mode, if a power button of the device is off while commercial power is supplied, if a command to perform the sleep mode is received through the repeater during an active mode, or if the command to perform the sleep mode is received through a remote controller during an active mode.

An operation module of the device enables power to be supplied only to the communication module and provides the communication module with information to perform the sleep mode when the device is currently in the sleep mode.

The communication module of the device determines if the device is currently in the sleep mode in operation 621. If it is determined that the device is currently in the sleep mode, the communication module determines if communication with the first repeater 200-1 which was connected in advance is unavailable in operation 622.

Determining if communication with the first repeater 200-1 is unavailable includes determining if communication with the repeater 200 has been interrupted, determining if communication is unavailable due to poor security, and determining if communication is unavailable because of occurrence of an error in the communication module.

The poor security may refer to a state in which a security key is updated slower than a predetermined time.

Determining if communication with the first repeater 200-1 is unavailable includes determining if information about poor security has been received from the first repeater 200-1.

The poor security may also refer to a state where an unauthorized user has attempted to access the first repeater 200-1 more than a predetermined number of times, which may be informed by the first repeater 200-1.

If it is determined that communication with the first repeater 200-1 is unavailable, the communication module of the device requests recovery of communication by transmitting a wakeup command and a recover communication command to the operation module 130, in operation 623.

Upon reception of the wakeup command and recover communication command, the operation module 130 of the device performs wakeup operation and recovers communication of the communication module, in operation 624.

Upon reception of the wakeup command and the recover communication command, the operation module 130 controls the power unit 140 to supply power to a component related to recovering communication of the communication module while blocking the power from being supplied to components that are not related to communication recovery.

Recovery of communication of the communication module may include recovering connection between the corresponding communication layers in the layered communication structure between the repeater and the device.

The communication module of the device recovers communication under control of the operation module 130, determines if communication has been successfully recovered in operation 625, and again transmit a recover communication command to the operation module 130 if it is determined that recovery of communication has been failed.

The communication module counts the number of times recovery of communication is performed, checks the counted number of times before retransmitting the recover communication command, determines if the counted number of times is equal to a preset number of times N in operation 626, and renders another determination of whether communication with the first repeater 200-1 is unavailable if the counted number of times is less than the preset number of times N.

The communication module transmits a command to recover communication with the second repeater 200-2, if the counted number of times equals to the preset number of times N.

The communication module attempts to establish communicative connection with the second repeater 200-2 under control of the operation module 130 in operation 627, determines whether communication with the second repeater 200-2 is available in operation 628, and, if it is determined that communication with the second repeater 200-2 is available, stores information about communication with the second repeater 200-2 and maintains communication with the second repeater 200-2.

If it is determined that communication with the second repeater 200-2 is also unavailable, the communication module transmits information about unavailable communication with the first and second repeaters 200-1 and 200-2 to the operation module to output the information through the user interface, in operation 629.

Outputting the information about an error in communication may be implemented by turning on an LED equipped in the device, or by displaying a notice on a display equipped in the device while the user manipulates the device.

The operation module of the device enters into the sleep mode if it is determined that communication of the communication module has been successfully recovered.

The operation module of the device cuts off power to the components related to recovering communication of the communication module while maintaining power to the communication module.

The communication module 120 of the device determines whether the wakeup command has been received from one of the plurality of repeaters when communication with the repeater is available, in operation 630, and transmits the wakeup command to the operation module 130 in operation 631 if it is determined that the wakeup command has been received.

Determining whether the wakeup command has been received includes determining whether the magic packet has been received and determining whether the magic packet includes wakeup information having the same identification of the device.

Specifically, the communication module determines whether a device address included in the wakeup information in the magic packet corresponds to identification information of the device, upon reception of the magic packet during the sleep mode, and determines whether to transmit the wakeup command based on the determination of whether the device address corresponds to the identification information.

Furthermore, the communication module may check operation information in the magic packet and transmit the operation information or operation command to the operation module 130.

This enables a function requested by the remote user to be performed in the device.

The operation module 130 performs wakeup operation in operation 632, upon reception of the wakeup command, and then performs an active mode.

As such, the device may increase user satisfaction by waking up the device each time there is a request from the user, by maintaining communicative connection between the communication module and the repeater.

Furthermore, the device may minimize power consumption of the device by stopping operation of a load unit when a wakeup command is transmitted to the operation module to recover communication of the communication module.

In addition, the device may perform operation of setting a function to be performed after wakeup, by receiving a magic packet including not only wakeup information but also operation information.

Accordingly, the device may provide services to the user by transmission and reception of the magic packet, which increases user convenience.

According to the exemplary embodiments, communication may be recovered by waking up an operation module of a device regardless of whether a magic packet is received.

According to the exemplary embodiments, disconnection of communication between a communication module of a device and a repeater may be substantially prevented by waking up an operation module of the device to recover communication of the communication module at predetermined intervals.

According to the exemplary embodiments, communicative connection between the device and the repeater may be maintained by waking up the operation module of the device to recover communication of the communication module at a time set by the user without a need to check the status of communication with the repeater.

The exemplary embodiments may be written as computer programs that may be implemented in general-use digital computers that execute the programs using a computer readable recording medium.

Examples of the computer readable recording medium include a read-only memory (ROM), a random-access memory (RAM), a compact disc read-only memory (CD-ROM), a magnetic tape, a floppy disk, an optical data storage device, etc. The computer readable recording medium may also be distributed over network coupled computer systems so that the computer readable code is stored and executed in a distributed fashion (e.g., transmission through the Internet).

At least one of the components, elements or units represented by a block as illustrated in the drawings may be embodied as various numbers of hardware, software and/or firmware structures that execute respective functions described above, according to an exemplary embodiment. For example, at least one of these components, elements or units may use a direct circuit structure, such as a memory, processing, logic, a look-up table, etc. that may execute the respective functions through controls of one or more microprocessors or other control apparatuses. Also, at least one of these components, elements or units may be specifically embodied by a module, a program, or a part of code, which contains one or more executable instructions for performing specified logic functions. Also, at least one of these components, elements or units may further include a processor such as a central processing unit (CPU) that performs the respective functions, a microprocessor, or the like. Further, although a bus is not illustrated in the above block diagrams, communication between the components, elements or units may be performed through the bus. Functional aspects of the above exemplary embodiments may be implemented in algorithms that execute on one or more processors. Furthermore, the components, elements or units represented by a block or processing steps may employ any number of related art techniques for electronics configuration, signal processing and/or control, data processing and the like.

Although a few embodiments have been shown and described, it would be appreciated by those skilled in the art that changes may be made in the exemplary embodiments without departing from the principles and spirit of the disclosure, the scope of which is defined in the claims and their equivalents.

What is claimed is:

1. An apparatus comprising at least one processor to implement:
   a communicator configured to determine whether a wakeup condition of the apparatus is satisfied while the apparatus is currently in a sleep mode, and transmit a wakeup command and a recover communication command in response to determining that the wakeup condition is satisfied, the wakeup condition comprising a condition in which communication between the communicator and an external device is unavailable due to at least one of a status of interruption of the communication and a status of poor security between the communicator and the external device; and an operator configured to perform a wakeup operation in response to the wakeup command, and control to recover a communication connection between the communicator and the external device in response to the recover communication command, wherein the operator is further configured to enter into the sleep mode in response to completion of recovery of the communication of the communicator.

2. The apparatus of claim 1, wherein the communicator is further configured to communicate with a repeater, which is configured to relay communication between the apparatus and another apparatus, and wherein the wakeup condition further comprises at least one of a condition in which communication between the communicator and the repeater is unavailable and a condition in which time that is set to recover communication arrives.

3. The apparatus of claim 2, wherein the time that is set to recover communication is a time based on a preset interval.

4. The apparatus of claim 3, wherein the communicator is further configured to transmit the wakeup command and the recover communication command to the operator in response to arrival of the time that is set to recover communication.

5. An apparatus comprising at least one processor to implement:

a communicator configured to communicate with a repeater, which is configured to relay communication between the apparatus and a second apparatus, determine availability of communication between the communicator and the repeater when the apparatus is currently in a sleep mode, and transmit a wakeup command and a recover communication command in response to determining that the communication between the communicator and the repeater is unavailable due to at least one of a status of interruption of the communication and a status of poor security between the communicator and an external device; and an operator configured to perform a wakeup operation in response to the wakeup command and control to recover a communication connection between the communicator and the repeater in response to the recover communication command, wherein the operator is further configured to enter into the sleep mode in response to completion of recovery of the communication of the communicator.

6. The apparatus of claim 5, further comprising a storage configured to store a computer program to be executed by the at least one processor to control recovery of the communication of the communicator.

7. The apparatus of claim 5, wherein the at least one processor further implements:

a load configured to cause the at least one processor to perform at least one function, wherein the operator is configured to control an operation of the load in response to the recover communication command.

8. The apparatus of claim 5, wherein the communicator is further configured to transmit the wakeup command and the recover communication command to the operator in response to arrival of time that is set to recover communication.

9. The apparatus of claim 5, wherein the communicator is further configured to receive a second wakeup command from the second apparatus through the repeater via the communication between the communicator and the repeater that is available, and transmit the second wakeup command to the operator such that the operator performs an active mode in response to the second wakeup command.

10. The apparatus of claim 9, wherein the second wakeup command is included in a magic packet that is generated by the second apparatus, wherein the magic packet comprises operation information indicating a function to be performed when the apparatus enters into the active mode, and wherein the communicator is further configured to transmit the operation information to the operator.

11. A method for controlling an apparatus for communicating with a repeater that relays communication with a second apparatus, the method comprising:

checking availability of communication between a communicator and the repeater, using the communicator; and transmitting, by the communicator, a wakeup command and a recover communication command to an operator in response to determining that the communication between the communicator and the repeater is unavailable due to at least one of a status of interruption of the communication and a status of poor security between the communicator and an external device, performing, by the operator, a wakeup operation in response to receiving the wakeup command from the communicator of the apparatus while the apparatus is currently in a sleep mode;

controlling, by the operator, recovery of a communication connection between the communicator and the repeater, in response to receiving the recover communication command from the communicator; and controlling, by the operator, the apparatus to enter into the sleep mode in response to completion of the recovery of the communication.

12. The method of claim 11, further comprising:

controlling an operation of a load to be stopped during the recovery of the communication.

13. The method of claim 11, further comprising:

determining whether a time that is set to recover communication arrives, using the communicator; and transmitting the wakeup command and the recover communication command to the operator in response to determining that the time that is set to recover communication arrives.

14. The method of claim 11, further comprising:

performing an active mode by transmitting a second wakeup command to the operator in response to receiving the second wakeup command from the second apparatus through the repeater while communication between the communicator and the repeater is available.

* * * * *